United States Patent
Sugawara et al.

[11] Patent Number: 6,084,719
[45] Date of Patent: Jul. 4, 2000

[54] PROJECTION LENS

[75] Inventors: Saburo Sugawara, Kawasaki; Ken Wada, Yokohama, both of Japan

[73] Assignee: Canon Kabushiki Kaisha, Tokyo, Japan

[21] Appl. No.: 09/140,176

[22] Filed: Aug. 25, 1998

[30] Foreign Application Priority Data

Aug. 29, 1997 [JP] Japan ................................. 9-249746
Nov. 12, 1997 [JP] Japan ................................. 9-310473

[51] Int. Cl.$^7$ ....................................................... G02B 3/00
[52] U.S. Cl. ........................... 359/651; 359/649; 359/749
[58] Field of Search .................................. 359/649, 650, 359/651, 751, 749, 750

[56] References Cited

U.S. PATENT DOCUMENTS

| | | | |
|---|---|---|---|
| 3,369,853 | 2/1968 | Tolle | 359/651 |
| 5,278,698 | 1/1994 | Iizuka et al. | 359/682 |
| 5,442,484 | 8/1995 | Shikawa | 359/651 |
| 5,666,228 | 9/1997 | Yamamoto | 359/651 |
| 5,900,989 | 5/1999 | Kreitzer | 359/691 |

Primary Examiner—Scott J. Sugarman
Assistant Examiner—Tim Thompson
Attorney, Agent, or Firm—Robin, Blecker & Daley

[57] ABSTRACT

A projection optical system includes, in order from a first conjugate point side of longer distance to a second conjugate point side of shorter distance, a first lens unit in which negative lenses included therein are larger in number than positive lenses included therein, and a second lens unit in which positive lenses included therein are larger in number than negative lenses included therein, wherein design parameters are determined such that an off-axial principal ray intersects an optical axis at a point between the first lens unit and the second lens unit and telecentricity is made on the second conjugate point side, and wherein the second lens unit includes, in order from the second conjugate point side, a negative lens of meniscus form convex toward the second conjugate point side and a positive lens whose both surfaces are convex.

19 Claims, 17 Drawing Sheets

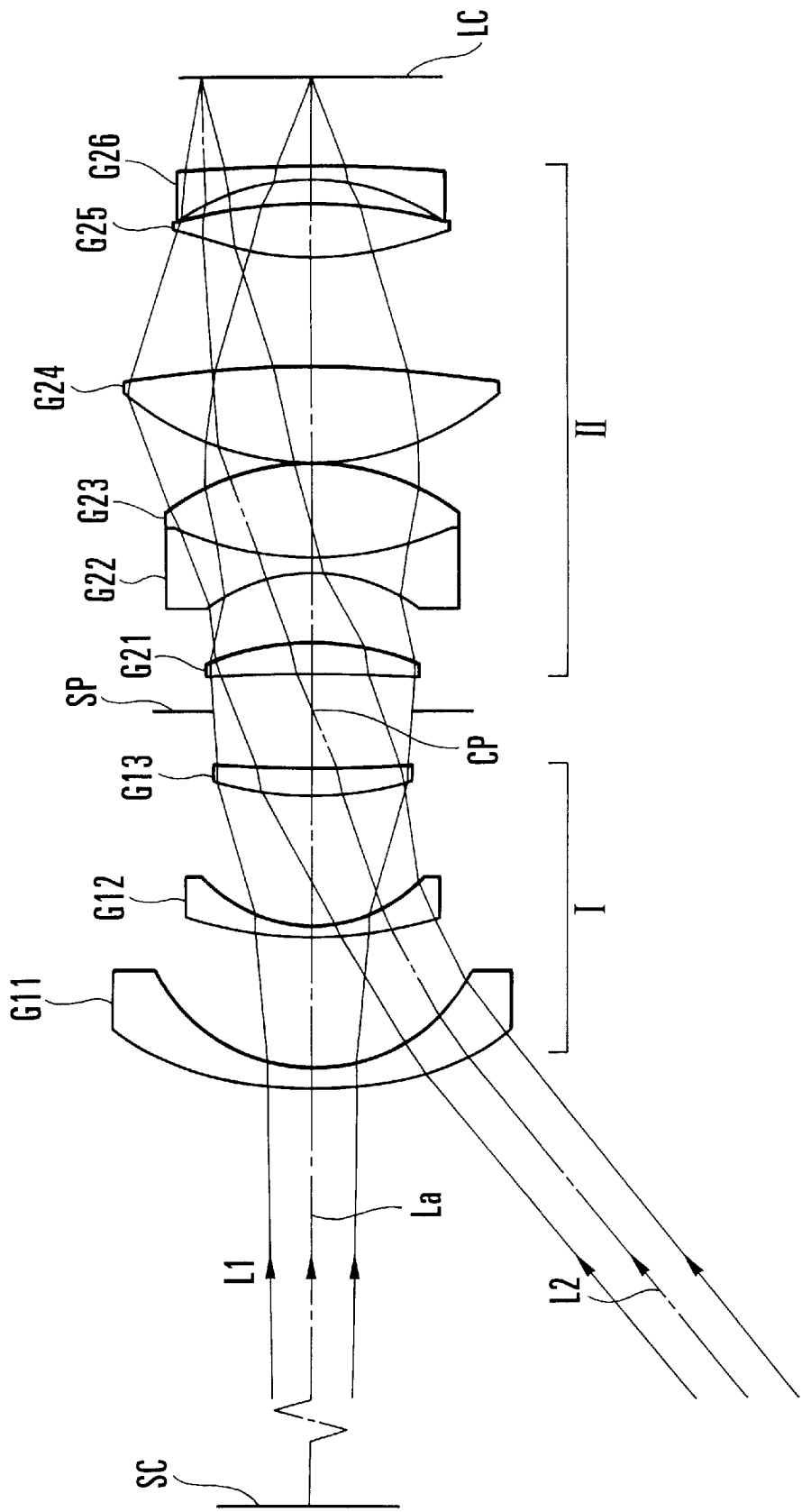

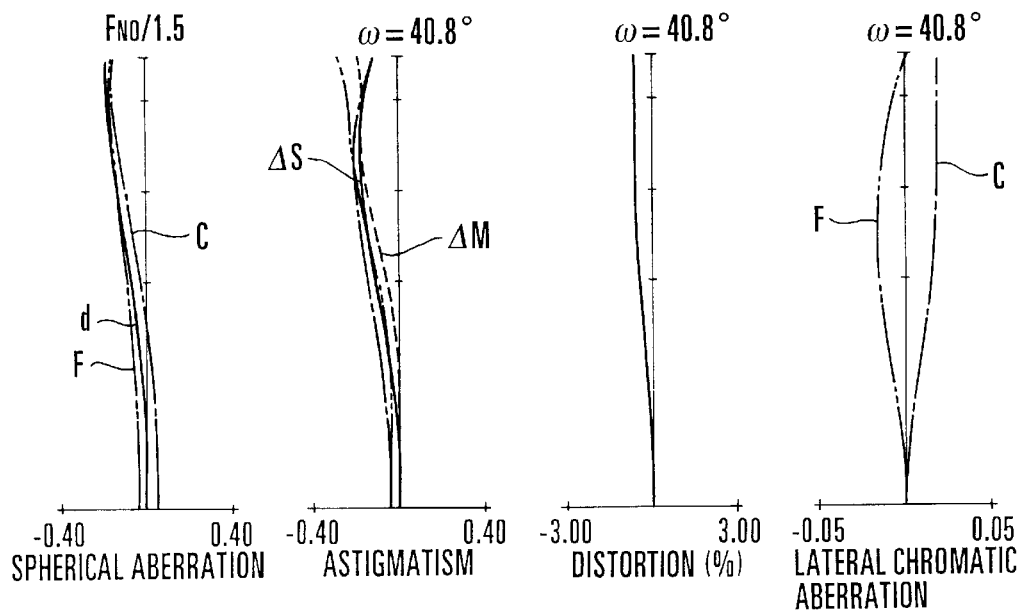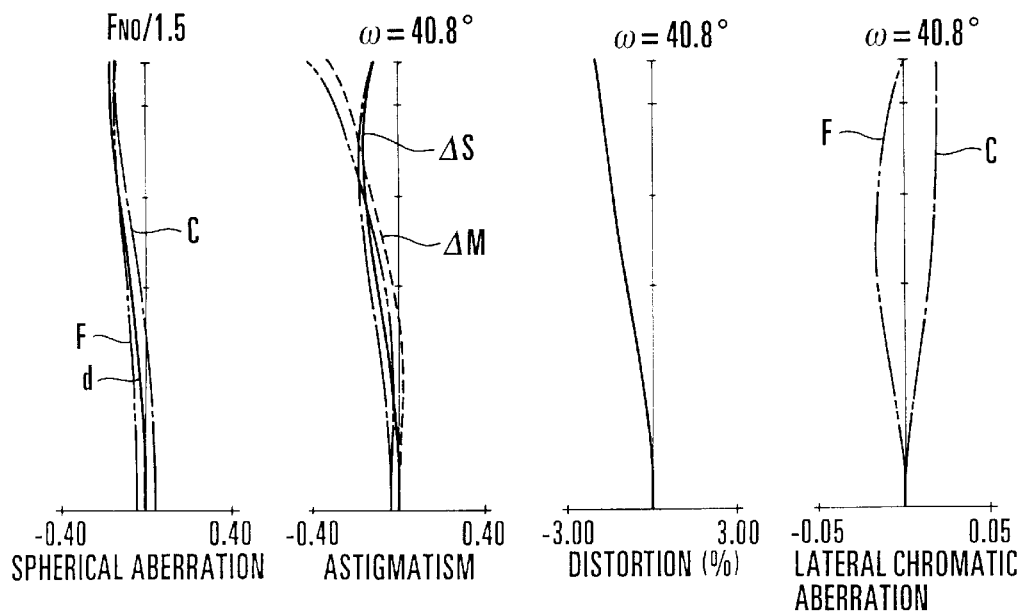

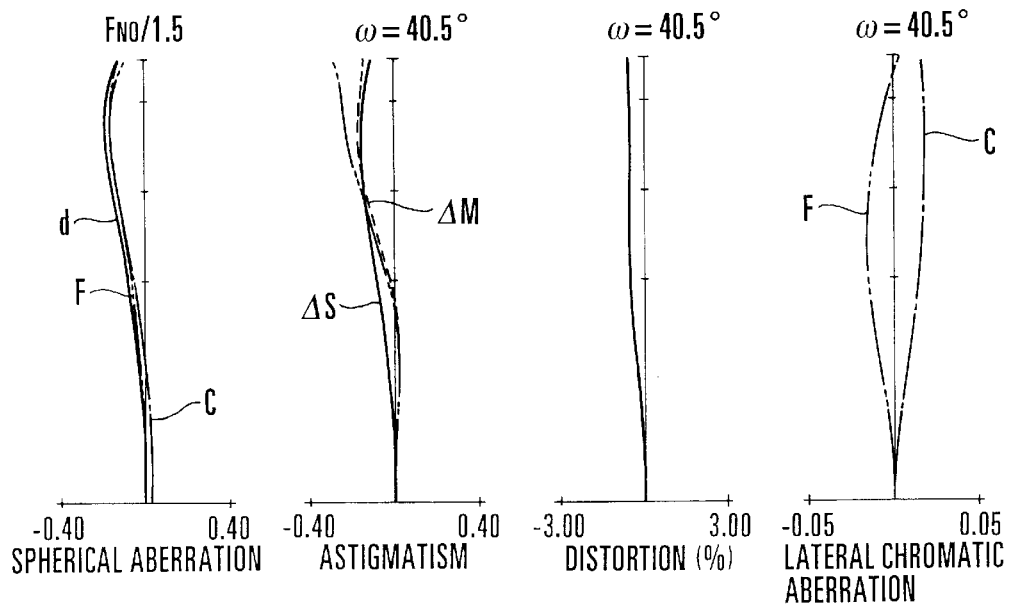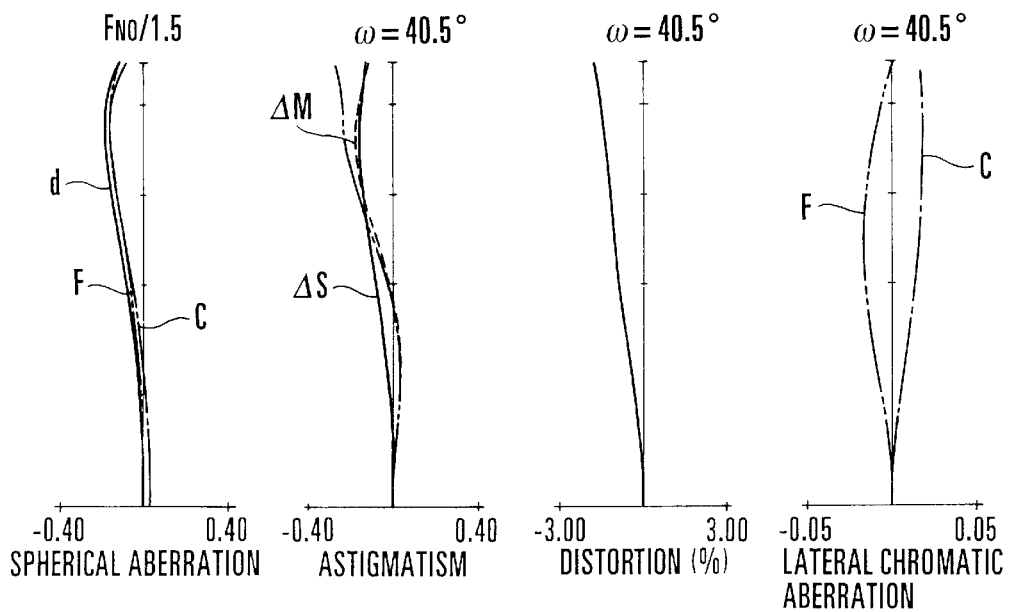

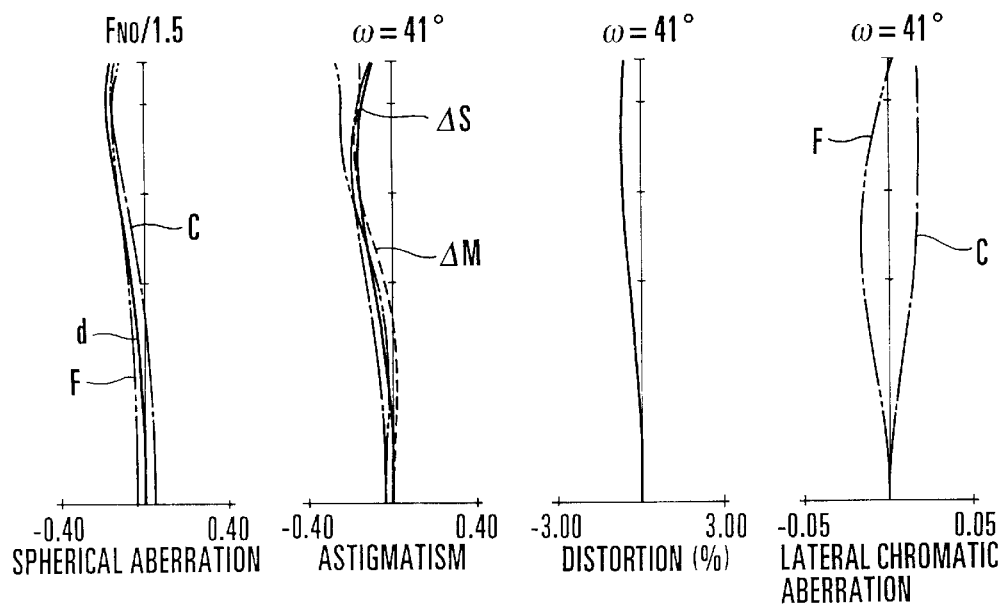
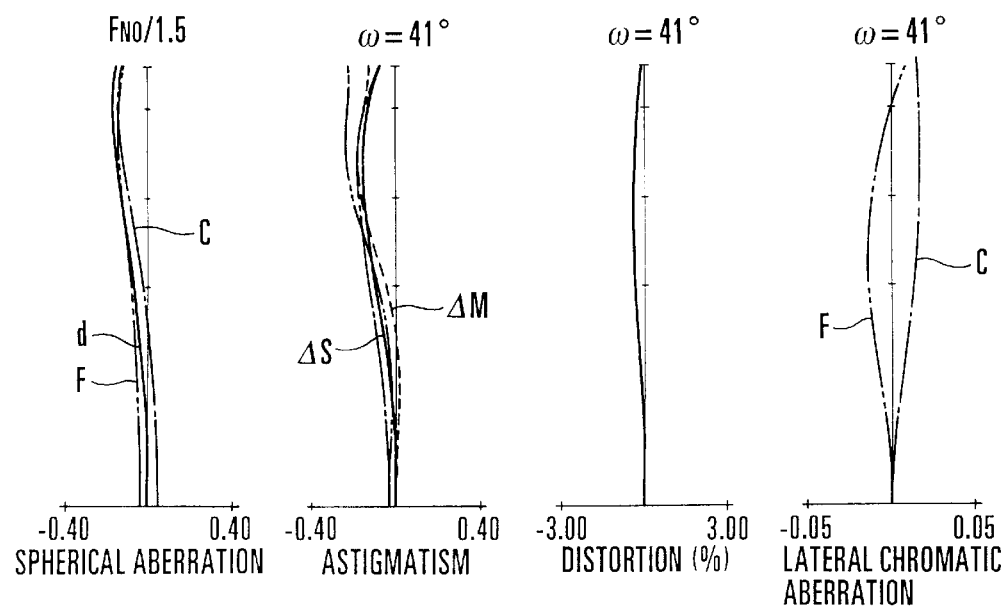

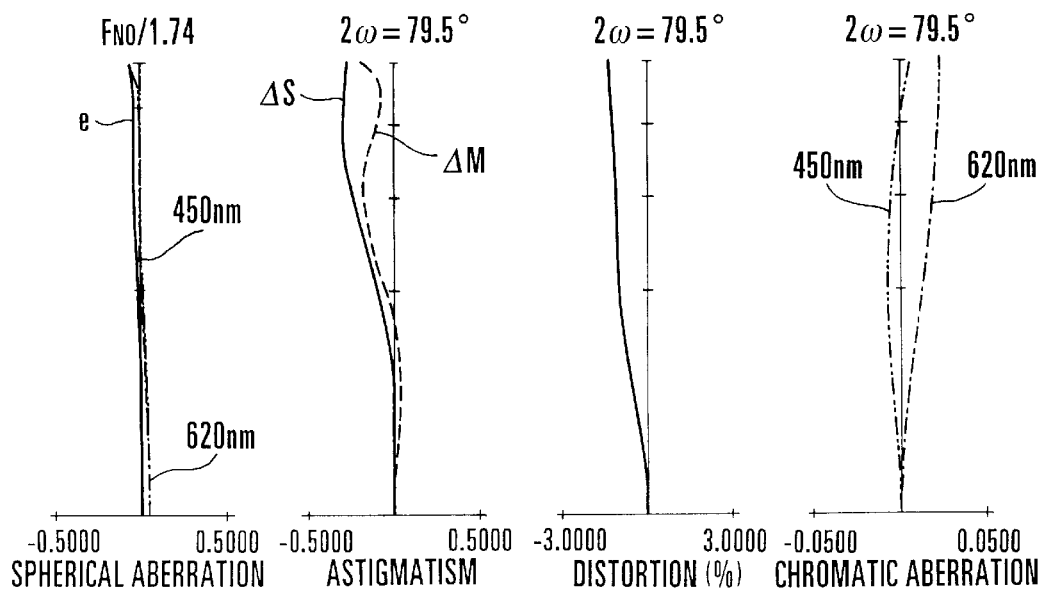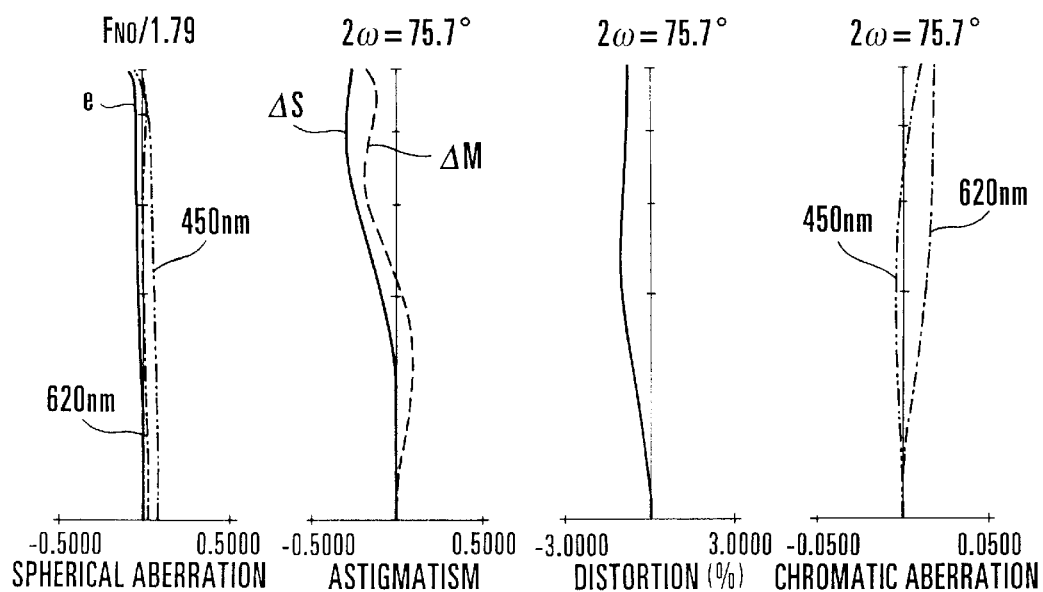

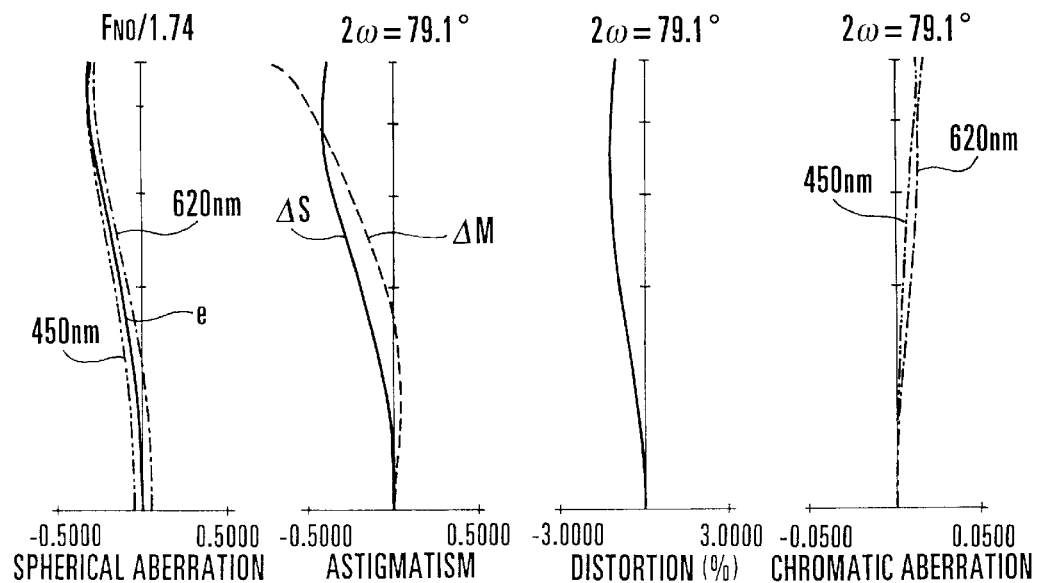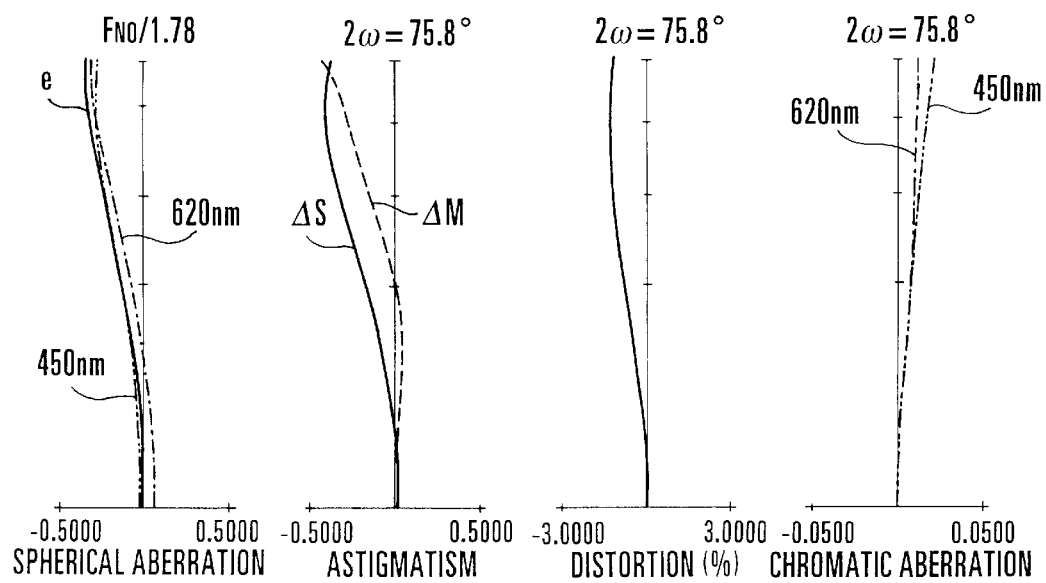

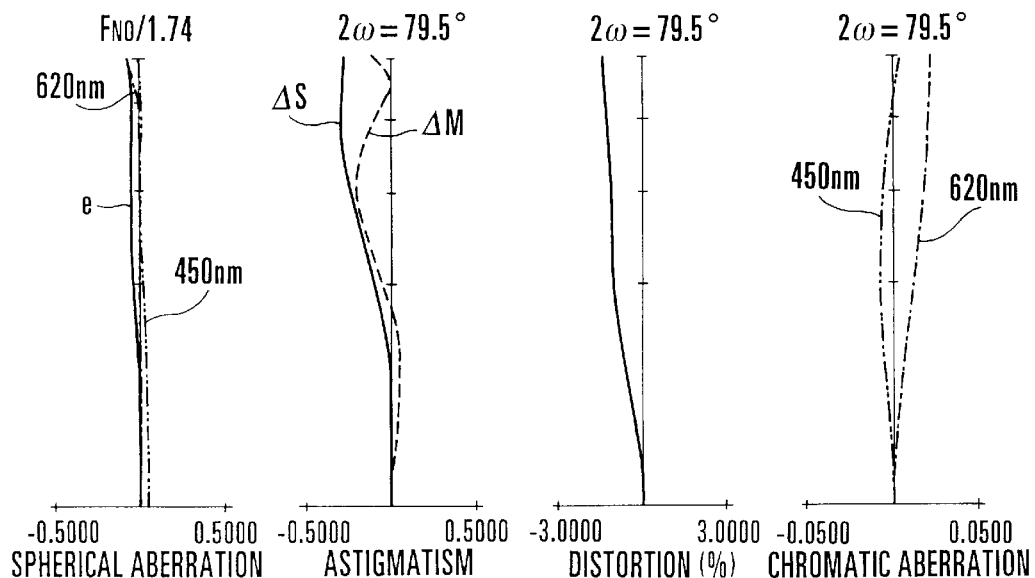
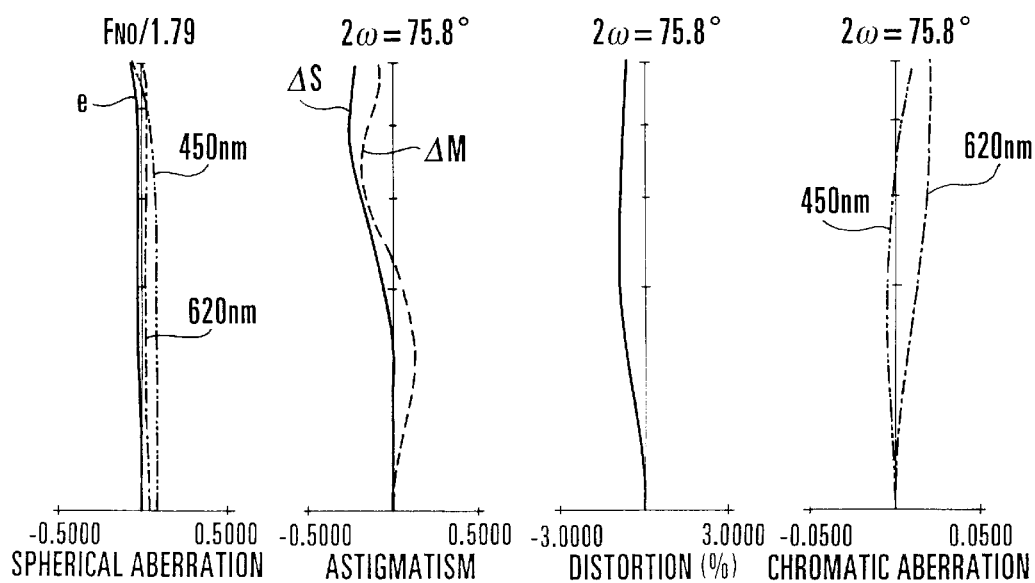

PROJECTION LENS

BACKGROUND OF THE INVENTION

1. Field of the Invention

The present invention relates to projection optical systems and projection apparatuses using the same and, more particularly, to projection optical systems suited to liquid crystal projectors in which an original picture in an image modulating element, for example, a liquid crystal display panel, is projected onto a screen in an enlarged scale. Still more particularly, the present invention relates to projection optical systems which are constructed by appropriate rules of design for the constituent lenses to keep good telecentricity, while still permitting projection to be carried out with a high optical performance.

2. Description of Related Art

A wide variety of projection optical systems and projection apparatuses using the same have been proposed for projecting an original picture in photographic film, or liquid crystal light bulb or cathode ray tube (CRT) onto a certain plane, for example, a screen, in an enlarged scale.

Many types of theprojection optical systems are available. With the CRT or liquid crystal panel used as the display of original pictures to project, it is required that the lens speed be as fast as, for example, 1.5 or below in F-number, that the image side of the diaphragm is telecentric, and that a certain long back focal distance be secured. To meet these requirements, such a type that the lens unit of negative refractive power leads, or a retro focus type, has found its use in most of the projection optical systems for the CRT.

As an example of such projection optical system, Japanese Laid-Open Patent Application No. Hei 4-311910 proposes a projection lens for use in a projection TV set using a 3-tube type CRT display.

In general, a projection apparatus using the CRT or liquid crystal panel as the display of original pictures to project has the distance from the projection lens to the screen (or the object distance) made changeable. As the distance changes, curvature of field is produced. In order to correct this aberration, it has been the common practice to provide the projection optical system with a negative lens at a position near the display (or CRT surface). By this, however, the telecentricity is sacrificed. Such a method is, therefore, hardly applied to the projection lens for the projector using the liquid crystal display device whose contrast changes to large extent when the angle of incidence of light changes.

Especially, a liquid crystal panel has a strong angle response characteristics. To obtain a good projected image, therefore, the angle of incidence of the off-axial light beam on the display must be made small. For example, the off-axial light beam must be made to enter the display plane at almost right angles. Also, many projection optical systems tend to have lesser corner illumination at, for example, 35% or thereabout. So, there is a deficit that the projected picture becomes dark in the marginal zone.

If, as the display of original pictures to project, the liquid crystal panel is used in -he projection apparatus, it becomes necessary that the projection optical system to be used be fast and provide rich corner illumination. Moreover, its section of the image side is necessarily a telecentric system. Otherwise, the projected image would no longer be excellent.

To fulfill the requirement of satisfying such conditions together with an additional requirement of minimizing all aberrations produced for a good optical performance, however, the whole lens system becomes complicated. For example, to construct the section of the image side in a telecentric form, an increased number of lens elements are necessary, giving rise to a problem that the entirety of the lens system becomes complicated and larger in size.

Referring now to FIG. 25, the construction of a common rear projection type television set is schematically shown. Within a casing 1, there are arranged a picture display means 2, a projection lens 3, a reflection mirror 4 and a screen 5. The light from the original picture in the display means 2 is enlarged by the projection lens 3 and projected through the intermediary of the reflection mirror 4 onto the screen 5. The screen 5 is made up from a Fresnel lens and a lenticular lens (not shown). At the front of the screen 5, the user can view a bright image.

Meanwhile, in recent years, the fineness of the image display means (concretely speaking, a CRT or liquid crystal display element) has been improved. Along with this improvement, there has occurred a demand for projection apparatuses capable of not only displaying motion pictures for television sets (NTSC pictures), but also projecting still pictures for computers (VGA, XGA, etc.).

However, the NTSC picture for television sets and the still picture for computers are different in image resolution. With the conventional apparatus, therefore, in order to project either of the pictures onto the screen in the same size, a scan converter has to be used with selective setting of the scanning rates. Supposing, for example, the NTSC picture and the VGA picture are to be selectively projected in the same size onto the screen, then the signal processing must be carried out in such a way as to display the NTSC picture in the over-scan mode and the VGA picture in the under-scan mode. However, the scan converter for processing the image signals, because of being expensive, becomes a cause of the cost increase of the projection apparatus itself.

BRIEF SUMMARY OF THE INVENTION

The present invention sets forth appropriate rules of design for the constituent lenses to easily obtain a certain lens speed (1.5 or thereabout in F-number) and also to correct all aberrations well despite the section of the image side in nearly telecentric form for excellent optical performance. It is, therefore, a first object of the invention to provide a projection optical system suited to be used in the liquid crystal projector, and a projection apparatus using the same.

A second object of the invention is to provide a projection lens which realizes the change of the scanning rate by varying the magnification, while still permitting the entire lens system to be constructed in a simple form.

To attain the above objects, in accordance with one aspect of the invention, there is provided a projection optical system, which comprises, in order from a first conjugate point side of longer distance to a second conjugate point side of shorter distance, a first lens unit in which negative lenses included therein are larger in number than positive lenses included therein, and a second lens unit in which positive lenses included therein are larger in number than negative lenses included therein, wherein design parameters are determined such that an off-axial principal ray intersects an optical axis at a point between the first lens unit and the second lens unit and telecentricity is made on the second conjugate point side, and wherein the second lens unit comprises, in order from the second conjugate point side, a negative lens of meniscus form convex toward the second conjugate point side and a positive lens whose both surfaces are convex.

Further, in accordance with another aspect of the invention, there is provided a projection lens for use in a projection apparatus in which a conjugate distance between an original picture and a screen onto which to project the original picture is substantially fixed, the projection lens comprising, in order from the screen side, a first lens unit of negative refractive power and a second lens unit of positive refractive power, wherein, when a magnification of projection is shifted from a higher magnification to a lower magnification, the first lens unit remains stationary and the second lens unit moves toward the screen side to change a focal length.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 4 is a longitudinal section view of a numerical example 4 of the projection lens of the invention.

FIGS. 5A to 5D are graphic representations of the aberrations of the numerical example 1 of the invention with the magnification of 1/27.

FIGS. 6A to 6D are graphic representations of the aberrations of the numerical example 1 of the invention with the magnification of 1/44 and d2=11.48.

FIGS. 7A to 7D are graphic representations of the aberrations of the numerical example 2 of the invention with the magnification of 1/27.

FIGS. 8A to 8D are graphic representations of the aberrations of the numerical example 2 of the invention with the magnification of 1/44 and d2=13.42.

FIGS. 9A to 9D are graphic representations of the aberrations of the numerical example 3 of the invention with the magnification of 1/27.

FIGS. 10A to 10D are graphic representations of the aberrations of the numerical example 3 of the invention with the magnification of 1/44 and d8=8.33.

FIGS. 17A to 17D and FIGS. 18A to 18D are graphic representations of the aberrations of the projection lens of the numerical example 6 in the wide-angle end and the telephoto end, respectively.

FIGS. 20A to 20D and FIGS. 21A to 21D are graphic representations of the aberrations of the projection lens of the numerical example 7 in the wide-angle end and the telephoto end, respectively.

FIGS. 23A to 23D and FIGS. 24A to 24D are graphic representations of the aberrations of the projection lens of the numerical example 8 in the wide-angle end and the telephoto end, respectively.

DETAILED DESCRIPTION OF THE INVENTION

Figure 1:
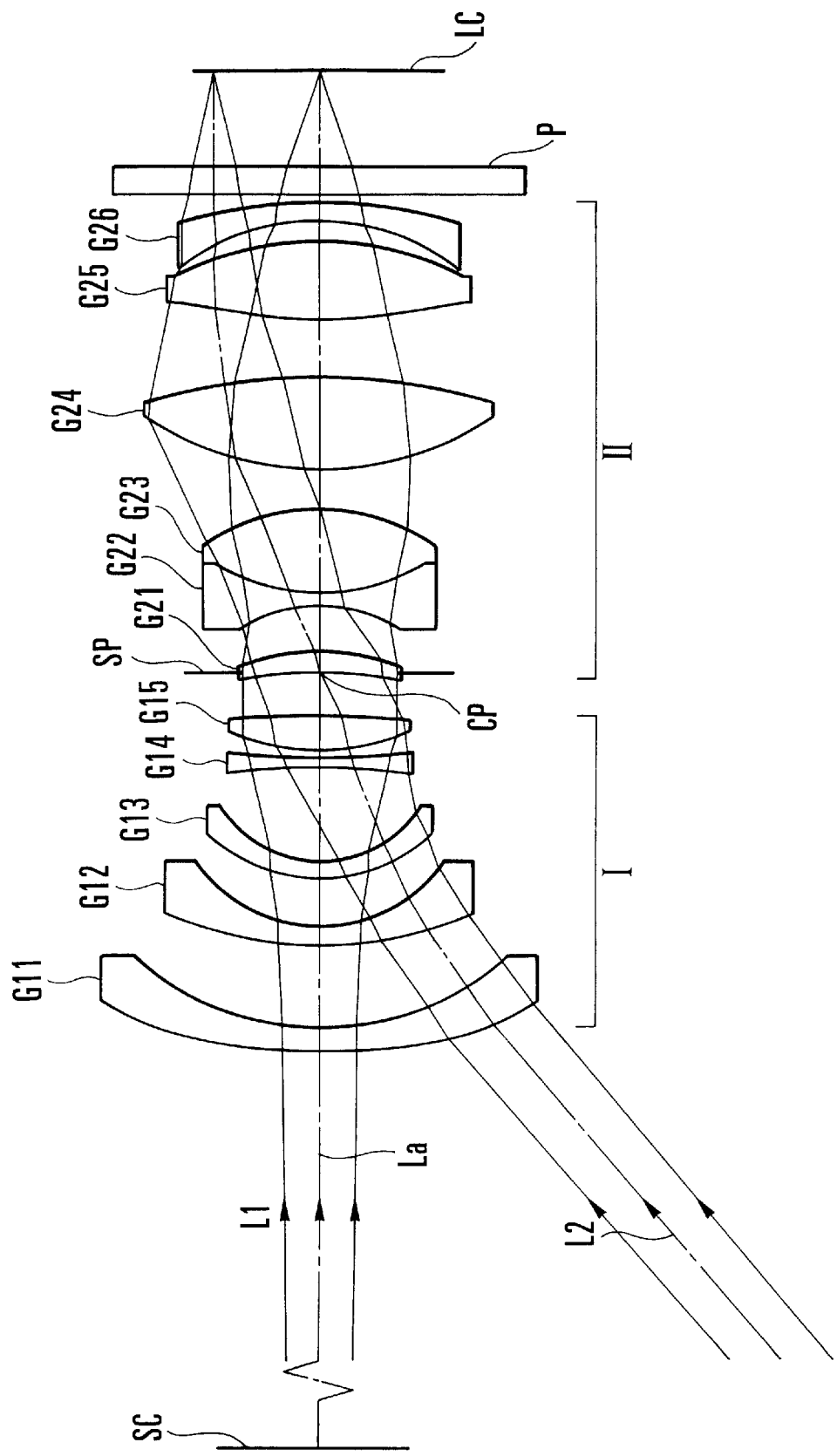
FIG. 1 is a longitudinal section view of a numerical example 1 of the projection lens of the invention.

Hereinafter, preferred embodiments of the invention will be described in detail with reference to the drawings.

FIGS. 1 to 4 in block diagram show the numerical examples 1 to 4 of the projection optical systems (projection lenses) of the invention. FIGS. 5A to 5D and FIGS. 6A to 6D show the aberrations of the numerical example 1 of the projection optical system of the invention when the magnification is 1/27 and 1/44 (d2=11.48), respectively. FIGS. 7A to 7D and FIGS. 8A to 8D show the aberrations of the numerical example 2 of the projection optical system of the invention when the magnification is 1/27 and 1/44 (d2=13.42), respectively. FIGS. 9A to 9D and FIGS. 10A to 10D show the aberrations of the numerical example 3 of the projection optical system of the invention when the magnification is 1/27 and 1/44 (d8=8.33), respectively. FIGS. 11A to 11D and FIGS. 12A to 12D show the aberrations of the numerical example 4 of the projection optical system of the invention when the magnification is 1/27 and 1/44 (d6=9.74), respectively.

To begin with, the constructional features of the projection optical system of the invention are described with reference to FIGS. 1 to 4.

A first lens unit I is constructed in the form of a retro focus type lens system with negative lenses lying at the front and being followed, after these, by positive lenses. A second lens unit II is a lens system of positive refractive power. P denotes the glass block such as cover glass of the liquid crystal panel. SP stands for the stop. The principal ray L2 of an off-axial light beam intersects an optical axis La at a point CP, where the stop SP lies. A screen SC is disposed on a first conjugate point side of longer distance (hereinafter referred also to "object side"). A liquid crystal display element LC (liquid crystal panel or the like) as a plane to project is disposed on a second conjugate point side of shorter distance (hereinafter referred also to "image side").

On the image side, in the case of, for example, the color liquid crystal projection, there are arranged liquid crystal display elements, a light source, filters and other elements, thereby constituting a projection apparatus.

The projection optical system of the present embodiment has as large an aperture ratio as 1.5 in F-number and is as wide in the angle of projection as 81 degrees. Also, on the image side, there is formed a telecentric system.

The invention aims at increasing the size of the projected image with decrease of the projecting distance (or the distance from the projection optical system to the screen S), and keeping the telecentricity good. To these ends, the projection lens is constructed in such a form that, as the principal ray of the off-axial light beam L2 intersects the principal ray of the on-axial light beam L1 at the point CP (stop SP), on the first conjugate point side of the stop SP, negative lenses are larger in number than positive lenses, while, on the second conjugate point side of the stop SP, positive lenses are larger in number than negative lenses. For this reason, when the off-axial light beam L2 is refracted by the constituent lenses, the proportion of the prism components of the same orientation becomes larger.

Assuming that the off-axial light beam coming from the space containing the first conjugate point side enters the first lens unit I at, for example, the upper margin, then it travels through many lenses at the parts corresponding to the prism components whose acute angles point downward. For this reason, large astigmatism and distortion are caused to be produced. To correct such aberrations, the second lens unit is constructed with inclusion of, in order from the second conjugate point side, a negative lens G26 of meniscus form convex toward the second conjugate point side and a bi-convex positive lens G25 to produce the reverse aberrations.

Also, the surface on the first conjugate point side of the positive lens G25 in the second lens unit is made to be an aspheric surface. By the action of this aspheric surface and the action of the surface on the first conjugate point side of the negative lens G26, the angle of incidence of the off-axial beam is made larger. In such a manner, the two lenses G25 and G26 on the second conjugate point side in the second lens unit are used to correct the astigmatism, distortion and other aberrations the lenses positioned on the first conjugate point side produce.

Also, the first lens unit includes, on the first conjugate point side, a negative lens G11 of meniscus form convex toward the first conjugate point side. This negative lens G11 axially moves when the distance from the projection lens to the first conjugate point (screen SC) (hereinafter called the "object distance") varies, since focusing is performed by moving the lens system as a whole. Moreover, in the case of, for example, FIG. 1 or FIG. 2, the negative lens G11 is made to move relative to the other lenses (G12–G15 or G12–G14) in the first lens unit I to thereby effect floating.

As the object distance varies, the height of incidence of the off-axial beam on the lens on the first conjugate point side in the first lens unit I varies to large extent, causing variation of the curvature of field. This aberration is corrected well by such floating.

The floating in the present embodiment is described in more detail below. As the object distance increases, the whole lens system approaches to the second conjugate point. Therefore, the height from the optical axis at which the off-axial light beam is incident on the lens surface on the first conjugate point side in the first lens unit becomes greater than when the object distance is shorter. Because of this, the field curvature comes to vary to a large extent.

So, in the present embodiment, not only the whole lens system moves forward to effect focusing down, but also the negative lens G11 closest to the first conjugate point side in the first lens unit is made to axially move in differential relation such that the separation between the negative lens G11 and the next one of the other lenses decreases. By using this floating movement, the variation of the height from the optical axis of the off-axial light beam on the negative lens G11 closest to the first conjugate point side is made smaller, thereby suppressing the variation of the field curvature to a minimum.

Figure 3:
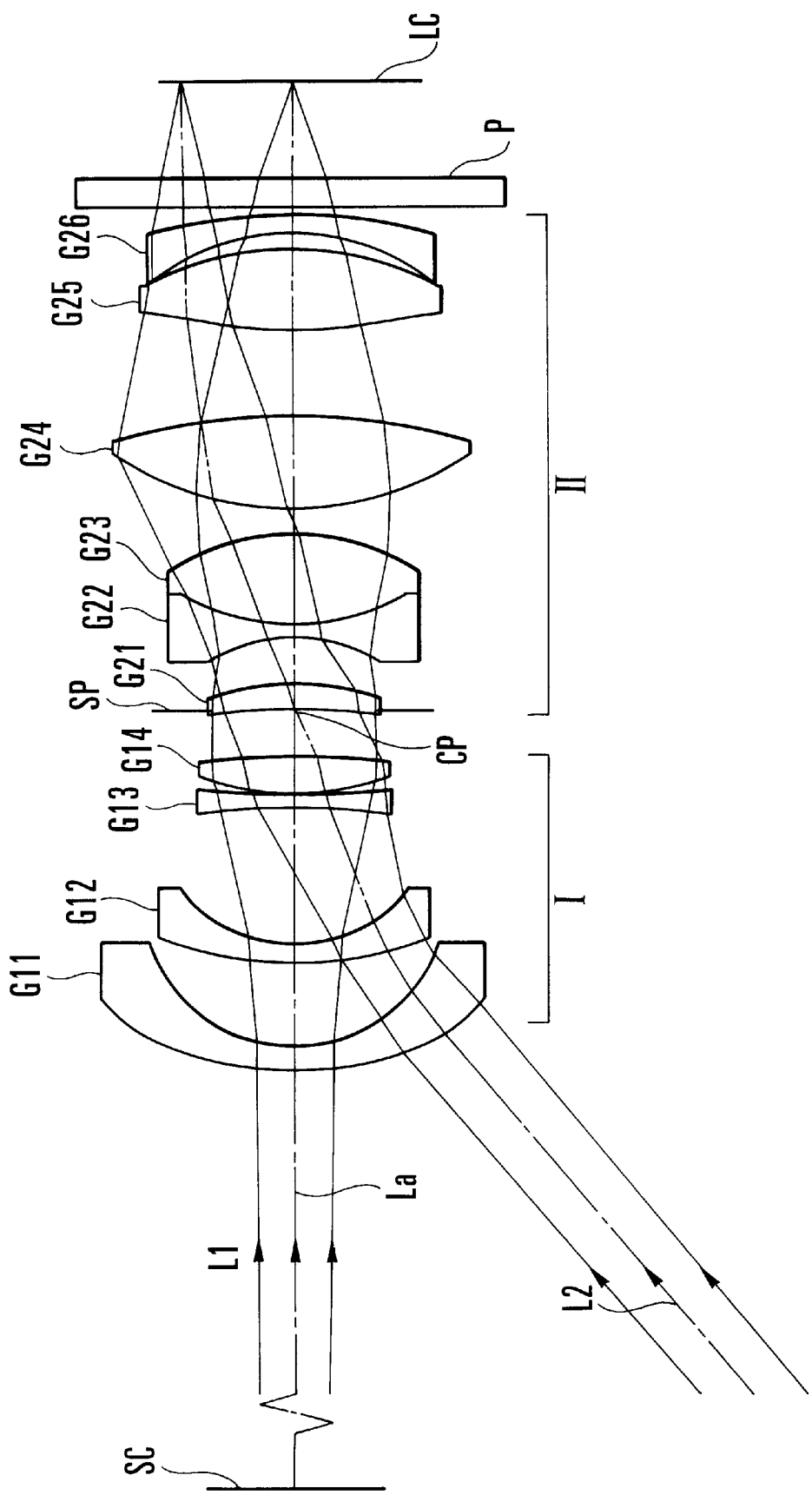
FIG. 3 is a longitudinal section view of a numerical example 3 of the projection lens of the invention.
Figures 11A, 11B, 11C, 11D:
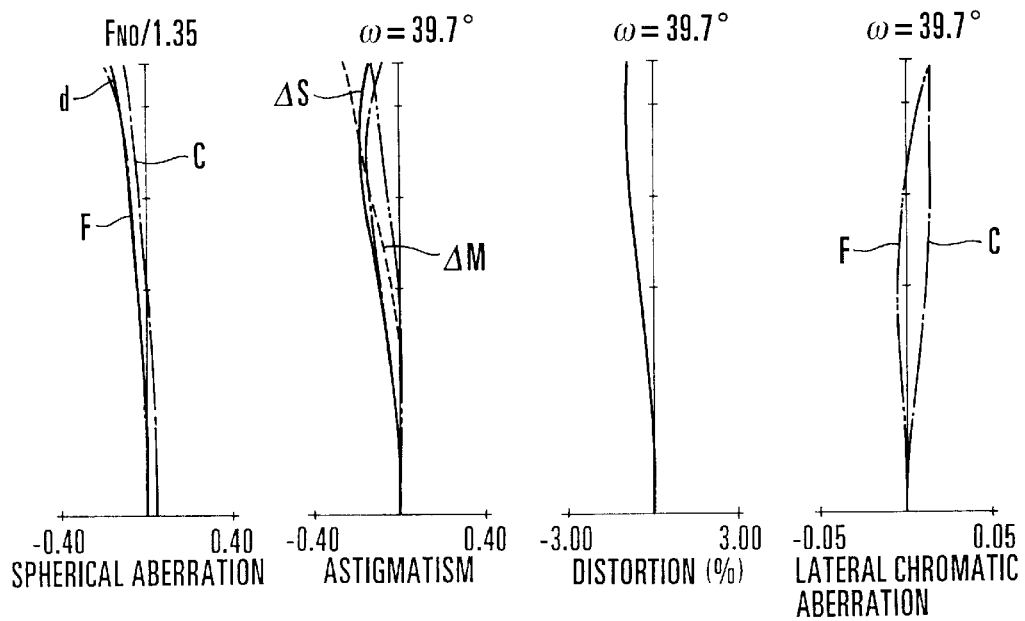
FIGS. 11A to 11D are graphic representations of the aberrations of the numerical example 4 of the invention with the magnification of 1/27.
Figures 12A, 12B, 12C, 12D:
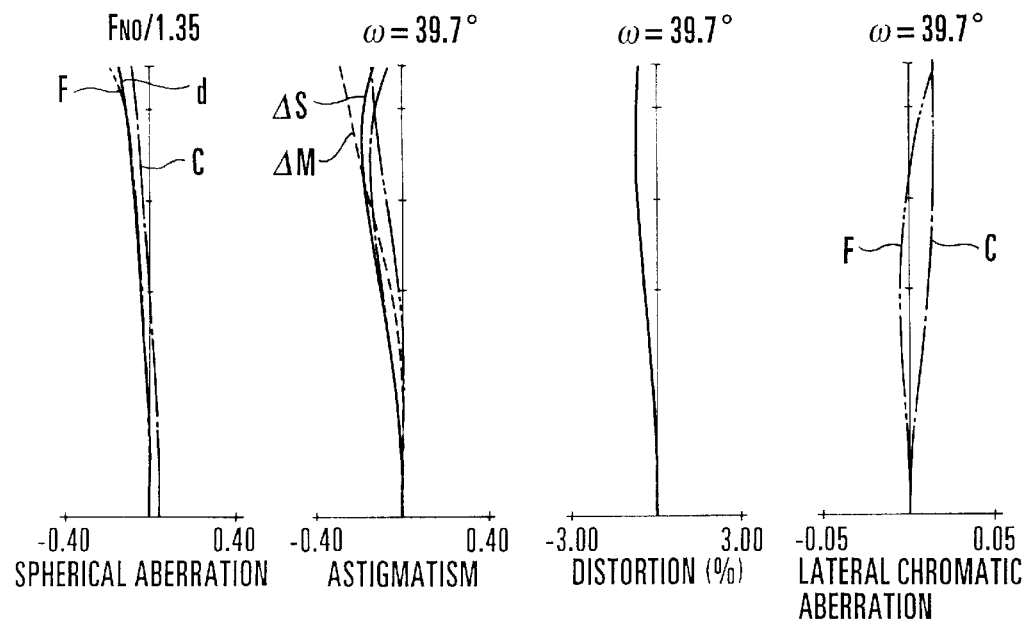
FIGS. 12A to 12D are graphic representations of the aberrations of the numerical example 4 of the invention with the magnification of 1/44 and d6=9.74.

In the numerical examples 3 and 4 shown in FIGS. 3 and 4, too, not only the whole lens system is moved forward to effect focusing down to shorter object distances, but also the separation between the first and second lens units I and II is made to vary for the floating purpose. The variation of the field curvature is thus corrected.

Another feature of the present embodiment is that the first lens unit is constructed with inclusion of the negative lens G11 closest to the first conjugate point side and a positive lens G15 closest to the second conjugate point side, so that the light beam is brought nearly to the afocal one in the space between the first and second lens units. This admits of the variation of the separation between the first and second lens units to some extent in stabilizing the height from the optical axis at which the on-axial light beam is incident on the first lens unit. This variation of spherical aberration is thus lessened.

For the off-axial beam, on the other hand, the height of incidence on the first lens unit varies to large extent. In this event, such variation of the separation between the first and second lens units causes variation of the location at which the off-axial beam travels in the first lens unit. The variation of field curvature is thus corrected.

It will be appreciated that the present embodiment employs the floating method of moving part of the projection lens. That is, the projection lens is provided with the mechanism for correcting the field curvature. This removes the variation of the field curvature with the variation of the object distance, and further the variations in the optical performance owing to the dimensional tolerances in manufacturing the aspherical lenses from plastics by the molding technique using dies.

Another feature is that a negative lens on the first conjugate side in the first lens unit and a lens in the second lens unit each are made of a plastic material and formed to an aspheric shape, thus correcting well the astigmatism and distortion which increase greatly by the first lens unit of the retro focus type.

In particular, the negative lens G11 on the first conjugate point side in the first lens unit is made aspherical, while the positive lens G25 in the second lens unit is selected to be an aspherical lens made of plastic material, thus minimizing the shift of the focal plane with the variation of the refractive index of the plastic due to the temperature and humidity.

For example, the refractive index of a plastic lens made of PMMA or the like decreases as the temperature increases. Therefore, when the temperature rises, the negative lens G11 in the first lens unit shifts the focal plane for the entire lens system to shorter back focal distances. The positive lens G25 in the second lens unit shifts the focal plane for the entire lens system to longer back focal distances. As a whole, the focal plane stands still. Incidentally, even if the plastic material is used in a positive lens of the first lens unit and in a negative lens of the second lens unit, a similar result can be attained.

Also, the plastic lenses can be produced by molding inexpensively and have a merit of light weight. The shape of the aspheric surface is such that, on the assumption that it is used for correcting distortion, being put on the first conjugate point side in the first lens unit, when applied to the negative lens, the negative power becomes progressively weaker farther away from the optical axis. When applied to the positive lens, it is preferred that the positive power becomes progressively stronger farther away from the optical axis.

It is also preferred that, when applied to the positive lens in the second lens unit, the shape of the aspheric shape is such that the positive power becomes progressively weaker toward the margin, and that, when applied to the negative lens, the negative power becomes progressively stronger toward the margin.

Also, as the most off-axial light beam passes across the aspheric surfaces of plastic materials in the first and second lens units, the angle of deviation of its principal ray is preferably made to be not more than 15 degrees in order to lower the sensitivity of the aspheric surface to the optical performance. To further lower the sensitivity of the angle of deviation of the principal ray of the off-axial light beam on the aspheric surface of the plastic material is preferably made to be 12 degrees or lower.

In such a manner, the sensitivity of the surfaces of the plastic lens can be made lower, as the plastic lens is used where the principal ray of the most off-axial beam has a small angle of deviation on the lens surface. Therefore, even though the aspherical lens is made up from the plastic material with a low precision accuracy of the surface, it is insured that a high optical performance can be obtained.

Another feature is that the produced amount of all aberrations is limited to a minimum, For this purpose, the first lens unit is constructed with inclusion of, in order from the first conjugate point side, at least two negative lenses of meniscus form convex toward the first conjugate point side and a positive lens having a convex surface of strong refracting power facing the first conjugate point side.

Also, the second lens unit is constructed, comprising, in order from the first conjugate point side, a positive lens of meniscus form convex toward the second conjugate point side, a cemented lens composed of a negative lens of bi-concave form and a positive lens of bi-convex form cemented together, two positive lenses of bi-convex form and a negative lens of meniscus form convex toward the second conjugate point side.

Of these lenses, the negative meniscus lens in the first lens unit makes great contribution to good correction of the distortion. The spherical aberration, coma and longitudinal and lateral chromatic aberrations are corrected well by specifying the form and the construction and arrangement of the constituent lenses.

In a specific embodiment, the first lens unit for the numerical example 1 shown in FIG. 1 comprises three negative lenses of meniscus form convex toward the first conjugate point side, a negative lens of bi-concave from and a positive lens of bi-convex form, totaling five lenses.

Figure 2:
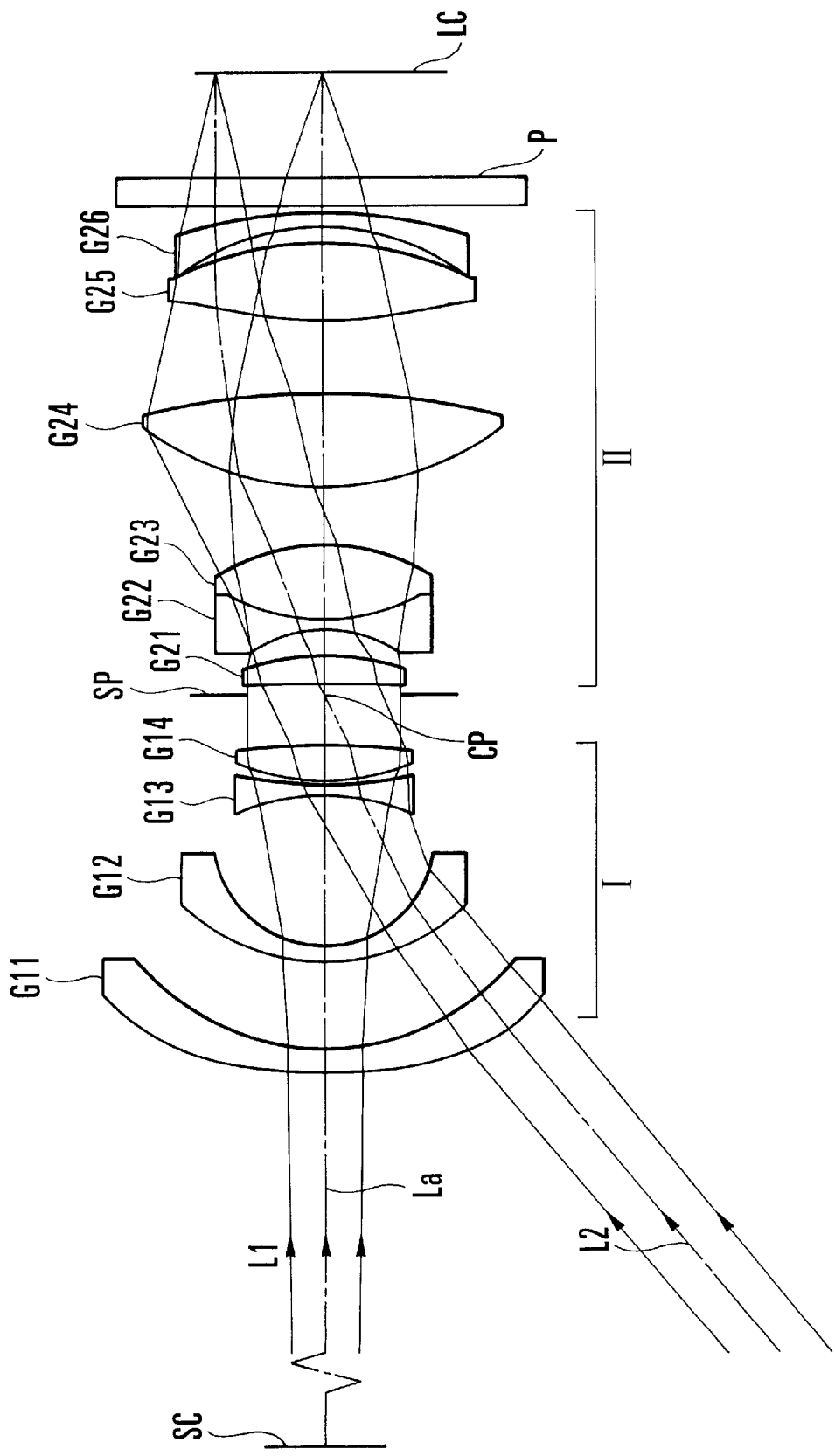
FIG. 2 is a longitudinal section view of a numerical example 2 of the projection lens of the invention.

For the numerical examples 2 and 3 shown in FIGS. 2 and 3, the first lens unit comprises two negative lenses of meniscus form convex toward the first conjugate point side, a negative lens of bi-concave lens and a positive lens of bi-convex form, totaling four lenses.

For the numerical example 4 shown in FIG. 4, the first lens unit comprises two negative lenses of meniscus form convex toward the first conjugate point side and a positive lens of meniscus form convex toward the first conjugate point side, totaling three lenses.

Next, the four numerical examples 1 to 4 of the invention are shown. In the numerical data for the examples 1 to 4, ri is the radius of curvature of the i-th lens surface, when counted from the object side, di is the i-th lens thickness or air separation, and ni and vi are respectively the refractive index and Abbe number of the material of the i-th lens element.

The shape of an aspheric surface is expressed in the coordinates with an X axis in the axial direction and a Y axis in the direction perpendicular to an optical axis by the following equation:

$$X = \frac{(1/R)Y^2}{1 + \sqrt{1 - (1+K)(Y/R)^2}} + AY^2 + BY^4 + CY^6 + DY^8 + EY^{10} + FY^{12} + GY^{14}$$

where R is the radius of the osculating sphere, and K, A, B, C, D and E are the aspheric coefficients. Also, the notation "D-0X" means "$\times 10^{-X}$".

Numerical Example 1:

```
    f = 21.07192        Fno = 1:1.5           2ω = 81.6°
  r1 = 154.173      d1 = 4.00         n1 = 1.49171     v1 = 57.4
  r2 = 48.315       d2 = 13.78 (Variable)
  r3 = 67.457       d3 = 3.20         n2 = 1.51633     v2 = 64.2
  r4 = 25.536       d4 = 8.28
  r5 = 27.833       d5 = 3.00         n3 = 1.51633     v3 = 64.2
  r6 = 20.494       d6 = 15.90
  r7 = -133.512     d7 = 1.80         n4 = 1.51633     v4 = 64.2
  r8 = 133.509      d8 = 1.26
  r9 = 42.447       d9 = 5.85         n5 = 1.84666     v5 = 23.8
  r10 = -209.186    d10 = 7.40
  r11 = Stop        d11 = 0.10
  r12 = -66.939     d12 = 3.70        n6 = 1.83400     v6 = 37.2
  r13 = -37.683     d13 = 7.91
  r14 = -25.087     d14 = 2.20        n7 = 1.84666     v7 = 23.8
  r15 = 34.968      d15 = 14.30       n8 = 1.69680     v8 = 55.5
  r16 = -34.971     d16 = 6.84
  r17 = 54.229      d17 = 15.80       n9 = 1.60311     v9 = 60.7
  r18 = -102.193    d18 = 9.64
  r19 = 67.149      d19 = 13.50       n10 = 1.49171    v10 = 57.4
  r20 = -54.806     d20 = 3.53
  r21 = -38.859     d21 = 3.20        n11 = 1.51633    v11 = 64.2
  r22 = -82.721     d22 = 0.20
  r23 = ∞           d23 = 4.90        n12 = 1.49000    v12 = 58.6
  r24 = ∞
Aspheric Coefficients:

no.   type          1                  2                3
  r1:    q     R = 1.541D + 02    K = 4.072D + 00   B = 2.432D - 06
                      4                  5                6
              C = -7.683D - 10   D = 3.224D - 13   E = -4.378D - 17
  no.   type          1                  2                3
  r19:   q     R = 6.714D + 01    K = -8.890D -     B = -4.171D -
                                          01                06
                      4                  5                6
              C = 5.933D - 10    D = -2.903D -     E = 2.556D - 15
                                          12
```

Numerical Example 2:

```
    f = 21.28778        Fno = 1:1.5           2ω = 81°
  r1 = 118.655      d1 = 4.00         n1 = 1.49171     v1 = 57.4
  r2 = 43.042       d2 = 14.92 (Variable)
  r3 = 36.775       d3 = 2.50         n2 = 1.51633     v2 = 64.1
  r4 = 19.166       d4 = 26.10
  r5 = -35.840      d5 = 1.80         n3 = 1.51633     v3 = 64.1
  r6 = 69.116       d6 = 0.56
  r7 = 39.160       d7 = 6.25         n4 = 1.84666     v4 = 23.8
  r8 = -117.458     d8 = 8.40
  r9 = Stop         d9 = 2.15
  r10 = -240.400    d10 = 4.80        n5 = 1.83400     v5 = 37.2
  r11 = -42.751     d11 = 4.35
  r12 = -24.062     d12 = 2.00        n6 = 1.84666     v6 = 23.8
  r13 = 35.614      d13 = 12.70       n7 = 1.69680     v7 = 55.5
  r14 = -35.618     d14 = 9.85
  r15 = 51.084      d15 = 16.30       n8 = 1.60311     v8 = 60.6
  r16 = -131.572    d16 = 12.30
  r17 = 65.728      d17 = 13.80       n9 = 1.49171     v9 = 57.4
  r18 = -53.450     d18 = 2.60
```

-continued

| r19 = −40.268 | d19 = 2.50 | n10 = 1.51633 | v10 = 64.1 |
|---|---|---|---|
| r20 = −81.745 | d20 = 0.20 | | |
| r21 = ∞ | d21 = 4.90 | n11 = 1.49000 | v11 = 58.6 |
| r22 = ∞ | | | |

Aspheric Coefficients:

| no. | type | 1 | 2 | 3 |
|---|---|---|---|---|
| r1: | q | R = 1.186D + 02 | K = 6.385D + 00 | B = 2.625D − 06 |
| | | 4 | 5 | 6 |
| | | C = −4.855D − 10 | D = 3.267D − 14 | E = 1.277D − 16 |

| no. | type | 1 | 2 | 3 |
|---|---|---|---|---|
| r17: | q | R = 6.572D + 01 | K = 3.481D + 00 | B = −5.925D − 06 |
| | | 4 | 5 | 6 |
| | | C = 1.908D − 10 | D = −3.366D − 12 | E = −3.604D − 16 |

Numerical Example 3:

| f = 20.86138 | | Fno = 1:1.5 | 2ω = 82° |
|---|---|---|---|
| r1 = 68.046 | d1 = 4.00 | n1 = 1.49171 | v1 = 57.4 |
| r2 = 25.073 | d2 = 13.81 | | |
| r3 = 61.278 | d3 = 3.20 | n2 = 1.51633 | v2 = 64.2 |
| r4 = 23.589 | d4 = 22.69 | | |
| r5 = −114.905 | d5 = 1.80 | n3 = 1.51633 | v3 = 64.2 |
| r6 = 116.903 | d6 = 0.60 | | |
| r7 = 45.475 | d7 = 5.81 | n4 = 1.84666 | v4 = 23.8 |
| r8 = −174.655 | d8 = 7.73 (Variable) | | |
| r9 = Stop | d9 = 0.34 | | |
| r10 = −94.397 | d10 = 4.20 | n5 = 1.83400 | v5 = 37.2 |
| r11 = −43.539 | d11 = 7.56 | | |
| r12 = −26.030 | d12 = 2.20 | n6 = 1.84666 | v6 = 23.8 |
| r13 = 36.301 | d13 = 14.95 | n7 = 1.69680 | v7 = 55.5 |
| r14 = −38.046 | d14 = 4.37 | | |
| r15 = 53.098 | d15 = 15.10 | n8 = 1.60311 | v8 = 60.7 |
| r16 = −103.278 | d16 = 14.03 | | |
| r17 = 62.802 | d17 = 13.52 | n9 = 1.49171 | v9 = 57.4 |
| r18 = −49.309 | d18 = 2.55 | | |
| r19 = −37.226 | d19 = 3.10 | n10 = 1.51633 | v10 = 64.2 |
| r20 = −85.524 | d20 = 0.20 | | |
| r21 = ∞ | d21 = 4.90 | n11 = 1.49000 | v11 = 58.6 |
| r22 = ∞ | | | |

Aspheric Coefficients:

| no. | type | 1 | 2 | 3 |
|---|---|---|---|---|
| r1: | q | R = 6.804D + 01 | K = 2.434D + 00 | B = 2.502D − 06 |
| | | 4 | 5 | 6 |
| | | C = −1.073D − 10 | D = 8.754D − 13 | E = −2.979D − 16 |

| no. | type | 1 | 2 | 3 |
|---|---|---|---|---|
| r17 | q | R = 6.280D + 01 | K = 2.274D + 00 | B = −6.430D − 06 |
| | | 4 | 5 | 6 |
| | | C = 1.361D − 09 | D = −8.628D − 12 | E = 6.621D − 15 |

Numerical Example 4:

| f = 21.85975 | | Fno = 1:1.35 | 2ω = 79.4° |
|---|---|---|---|
| r1 = 85.441 | d1 = 3.20 | n1 = 1.49171 | v1 = 57.4 |
| r2 = 29.261 | d2 = 21.27 | | |
| r3 = 67.896 | d3 = 2.00 | n2 = 1.60311 | v2 = 60.7 |
| r4 = 24.641 | d4 = 21.56 | | |
| r5 = 55.696 | d5 = 4.67 | n3 = 1.84666 | v3 = 23.8 |
| r6 = 225.731 | d6 = 9.24 (Variable) | | |
| r7 = Stop | d7 = 6.11 | | |
| r8 = −270.587 | d8 = 5.27 | n4 = 1.83400 | v4 = 37.2 |
| r9 = −45.202 | d9 = 11.75 | | |
| r10 = −28.818 | d10 = 2.50 | n5 = 1.84666 | v5 = 23.8 |
| r11 = 53.053 | d11 = 15.62 | n6 = 1.69680 | v6 = 55.5 |

-continued

| r12 = −40.035 | d12 = 0.25 | | |
|---|---|---|---|
| r13 = 47.476 | d13 = 15.72 | n7 = 1.60811 | v7 = 60.7 |
| r14 = −189.244 | d14 = 17.93 | | |
| r15 = 45.871 | d15 = 9.00 | n8 = 1.49171 | v8 = 57.4 |
| r16 = −81.095 | d16 = 3.81 | | |
| r17 = −38.326 | d17 = 2.50 | n9 = 1.51633 | v9 = 64.2 |
| r18 = −250.550 | | | |

Aspheric Coefficients:

| no. | type | 1 | 2 | 3 |
|---|---|---|---|---|
| r1: | q | R = 8.544D + 01 | K = −1.059D + 00 | B = 2.739D − 06 |
| | | 4 | 5 | 6 |
| | | C = −5.587D − 10 | D = 4.814D − 13 | E = 0.00D + 00 |

| no. | type | 1 | 2 | 3 |
|---|---|---|---|---|
| r15: | q | R = 4.587D + 01 | K = −4.107D − 01 | B = −3.883D − 06 |
| | | 4 | 5 | 6 |
| | | C = 7.619D − 10 | D = −4.402D − 12 | E = 0.00D + 00 |

The values of the angle of deviation of the off-axial principal ray on the aspherical plastic lenses for the numerical examples 1 to 4 are listed in Table-1 below.

TABLE 1

| Numerical Example | Surface on the first conjugate point side | | Surface on the second conjugate point side | |
|---|---|---|---|---|
| No. | No. | Angle | No. | Angle |
| 1 | r1 | 6.222° | r2 | 1.468° |
| | r19 | 5.444° | r20 | 9.451° |
| 2 | r1 | 1.942° | r2 | 0.230° |
| | r17 | 5.816° | r18 | 10.041° |
| 3 | r1 | 2.903° | r2 | 6.597° |
| | r17 | 5.887° | r18 | 10.155° |
| 4 | r1 | 4.694° | r2 | 5.323° |
| | r15 | 7.107° | r16 | 8.114° |

It will be appreciated from the foregoing that, according to the invention, the appropriate rules of design are set forth for the constituent lenses to easily obtain a certain lens speed (1.5 or thereabout in F-number). Also with the image side section in nearly telecentric form, all aberrations can be corrected well for excellent optical performance. Therefore, it becomes possible to achieve a projection optical system suited to the liquid crystal projector, and a projection apparatus using the same.

In particular, according to the invention, with the limitation of the number of constituent lenses to a minimum, it is made possible that the lens speed is as high as 1.5 or thereabout in F-number, the telecentricity is good, the corner illumination is as rich as 50%–60%, and the optical performance is excellent, thus realizing a projection optical system suited to the single chip liquid crystal projector. Also, the aspherical lenses are made from plastic materials to reduce the production cost, and are arranged in appropriate positions to reduce the shift of the focal plane with change of the ambient temperature. Also, the projection lens is made movable in part to compensate for the deterioration of the optical performance due to the change of the projecting distance and the manufacturing tolerance, thus being able to keep hold of good optical performance.

Also, the projection optical system of the present invention has as wide an angle of projection as 80 degree or thereabout and, therefore, is optimal as is used particularly in the rear projection type television set.

Next, another embodiment of the invention is described as applied to the projection lens for projection apparatus in which the distance between the conjugate points, or the original picture and the screen onto which to project the original picture, is substantially fixed. The projection lens comprises, in order from the screen side, a first lens unit of negative refractive power and a second lens unit of positive refractive power and operates with the selection of focal length settings. When the magnification of projection is shifted from a relatively high magnification to a low magnification, the first lens unit is left stationary, and the second lens unit moves toward the screen side.

FIGS. 13, 16, 19 and 22 are longitudinal section views of numerical examples 5 to 8 of projection lenses according to the invention, respectively.

In these figures, I denotes the first lens unit of negative refractive power, and II denotes the second lens unit of positive refractive power. A third lens unit III of positive refractive power is further included. ST stands for the stop. An original picture displayed on a liquid crystal display element LC is projected onto the screen SC. CG stands for the cover glass. The liquid crystal display element LC is of the transmission type and receives Koehler illumination from an illumination system (not shown).

The projection lens of each of the numerical examples is adapted to be used in the rear projection apparatus in which the original picture and the screen are substantially fixed at a finite distance. The second lens unit II is made to axially move when the focal length is changed over between two values (of which the short focal length is hereinafter, on convenience, called the "wide-angle" end, and the long focal length the "telephoto" end), i.e., when the magnification of projection is shifted. Further, in any of the numerical examples, when changing over from the wide-angle end to the telephoto end, the second lens unit II moves toward the screen side, but the first lens unit II and the third lens unit III remain stationary.

In such a manner, the projection lens of the present embodiment, despite making such a simple arrangement as only to move the second lens unit II, can change the magnification of projection. Therefore, the scanning rate can be converted between two sorts of pictures of different resolutions. The projection lens of the present embodiment is usable in the common rear projection type television set like that shown in FIG. 25.

On realization of the projection lens of the character described above, more desirable features of the present embodiment are described below.

(a) In each of the numerical examples, a strong concave surface on the liquid crystal element side (the second surface) of a lens closest to the screen side of the first lens unit I is an aspheric surface. The aspheric surface is formed to such a shape that the negative refractive power becomes weaker in the marginal zone so as to moderate the barrel type distortion the concave lens produces.

(b) In the rear projection apparatus, the shorter the focal length of the projection lens, or the wider the field angle, the shorter the conjugate distance to the screen can be made. Therefore, it becomes possible to reduce the physical size of the apparatus. From the point of view of the aberration correction, it is desired that the first lens unit I refracts the off-axial or oblique light beam as gently as possible. For this reason, in each of the numerical examples, at least two lenses constituting the first lens unit are formed to negative meniscus shapes convex toward the screen side, thus suppressing the aberrations to a good stability.

(c) To project the light from the liquid crystal display element LC onto the screen with good efficiency, it is desired to put the pupil of the projection lens at infinity as viewed from the liquid crystal display element LC, in other words, construct the projection lens in a substantially telecentric form to the image side. On this account, in the projection lens of each of the numerical examples, the lens configuration is so determined that, letting an overall focal length in the wide-angle end of lenses which lie nearer the liquid crystal element LC than the stop ST be denoted by fr, and a distance from the stop to a front principal point of the whole lenses which lie nearer the liquid crystal element LC than the stop ST be denoted by L, the following condition is satisfied:

$$0.85 < L/fr < 1.0 \tag{1}$$

When the lower limit of the condition (1) is exceeded, as this means that the pupil takes a relatively near position, the matching with the illuminating system becomes worse, giving rise to a problem that the illumination in the marginal zone of the image frame on the screen lowers. Particularly, in the single chip type projection television set that employs the micro lens, objectionable phenomena such as color unevenness occur. When the upper limit of the condition (1) is exceeded, as this means that the overall refractive power of the lenses which lie nearer the liquid crystal element LC than the stop ST is too strong, it becomes difficult to correct aberrations.

(d) The third lens unit III is used to make a good compromise between the minimization of the physical size and the telecentricity (the infinitizing of the pupil position). So, it is desired to strengthen its positive refractive power within the range satisfying the condition (1). Since the third lens unit III is closest to the liquid crystal display element LC, it has a large influence on the characteristics of the off-axial image surface, and, therefore, needs to have a surface of negative refracting action that, on aberration, cancels the component of the strong positive refractive power. Before and after this surface of negative refracting action, what is rather desired is that the principal rays are nearly parallel on the side to the liquid crystal display element LC and concentric on the side to the screen. In this respect, a negative lens having a strong concave surface facing the screen SC is advantageous. The term "strong" concave surface used herein means the relative concept on comparison of the two refracting surfaces of that lens.

(e) For the projection lens of each numerical example, letting paraxial lateral magnifications in the wide-angle end of the first lens unit I and the second lens unit II be denoted by $\beta 1w$ and $\beta 2w$, respectively, a ratio of variable magnifications (scanning rate) be denoted by Z, an amount of movement of the second lens unit II from the wide-angle end to the telephoto end be denoted by M, a distance from a focal point on the screen side of the first lens unit I to the screen SC be denoted by x, focal lengths of the first lens unit I and the second lens unit II be denoted by f1 and f2, respectively, and a principal point interval between the first lens unit I and the second lens unit II be denoted by ew, the following conditions are satisfied:

$$\beta 2w = 1/\sqrt{Z} \tag{2}$$

$$M = f2 \times \beta 2w \times (1-Z) \tag{3}$$

$$\beta 1w = f1/x \quad (4)$$

$$ew = f1 + f2 - f1 \times \beta 1w - f2/\beta 2w \quad (5).$$

Figure 25:
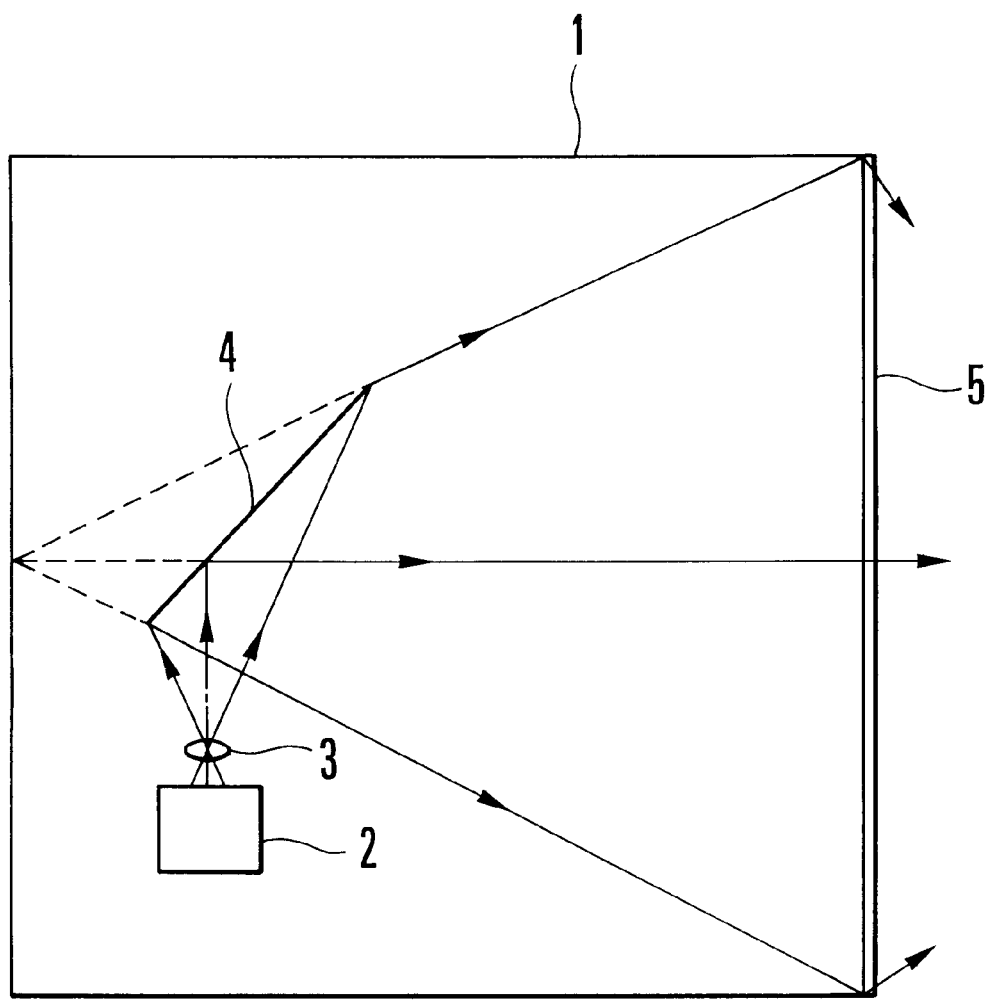
FIG. 25 is a schematic diagram of the construction of a common rear projection type television set.

Here, the change of the scanning rate of the projection apparatus is about 10° in the change of the magnification of the projection lens. That is, from the equations (2) and (3), it is understandable that the paraxial lateral magnification the second lens unit II to use is in the neighborhood of unity, and conversely that the position sensitivity of the second lens unit II becomes low. Therefore, more or less movement of the second lens unit II does not cause too much change of the image sharpness. For the purpose of correcting the focus, there is no need to move another lens unit. This is very favorable. Because of this, even when the projection lens of the present embodiment is built in the rear projection television set as shown in FIG. 25, the magnification of projection can be finely adjusted by controlling the position of the second lens unit II.

(f) To adjust the focus in accordance with variation of the conjugate distance between the original picture (liquid crystal display element) and the screen, it is desired either to move the entire projection lens or to axially move the third lens unit III. In the case where, as the screen size changes, focusing results in deterioration of the image, it is desired to perform compensation by the floating mechanism in the first lens unit I.

While the projection lens of each of the numerical examples has been described as satisfying all the following features or conditions:

(a) The first lens unit has at least one aspheric surface;

(b) The first lens unit is constructed with a plurality of negative meniscus lenses convex toward the screen side;

(c) The inequalities of condition (1) are satisfied.

(d) The third lens unit of positive refractive power has a negative lens having a strong concave surface facing the screen side;

(e) The equations of conditions (2) to (5) are satisfied; and (f) Focusing is performed by moving the entire projection lens, or by axially moving the third lens unit, it is to be understood that the projection lens of the invention is not confined thereto. Even if at least one of these features is satisfied, it is possible to expect the respective individual results.

Next, each of the numerical examples is explained.

Numerical Example 5

Figure 13:
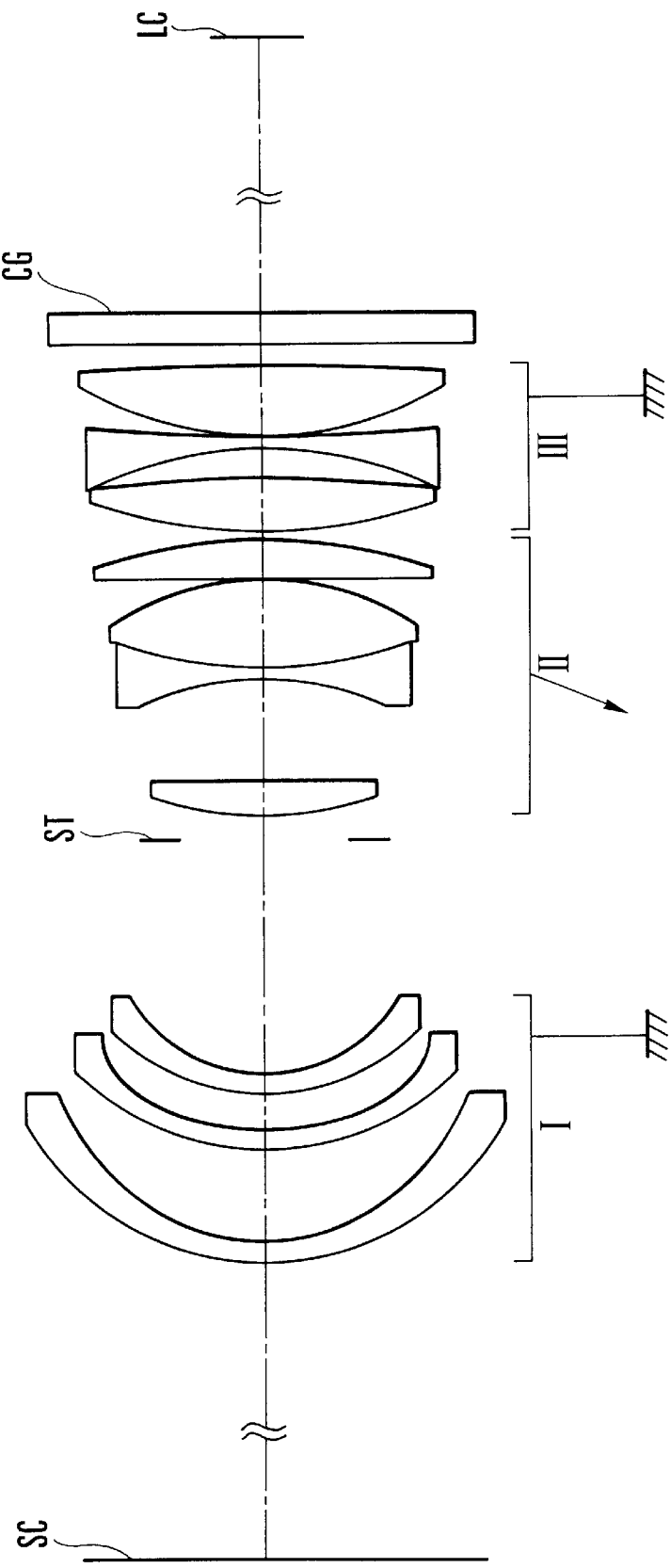
FIG. 13 is a longitudinal section view of a numerical example 5 of the projection lens.
Figures 14A, 14B, 14C, 14D:
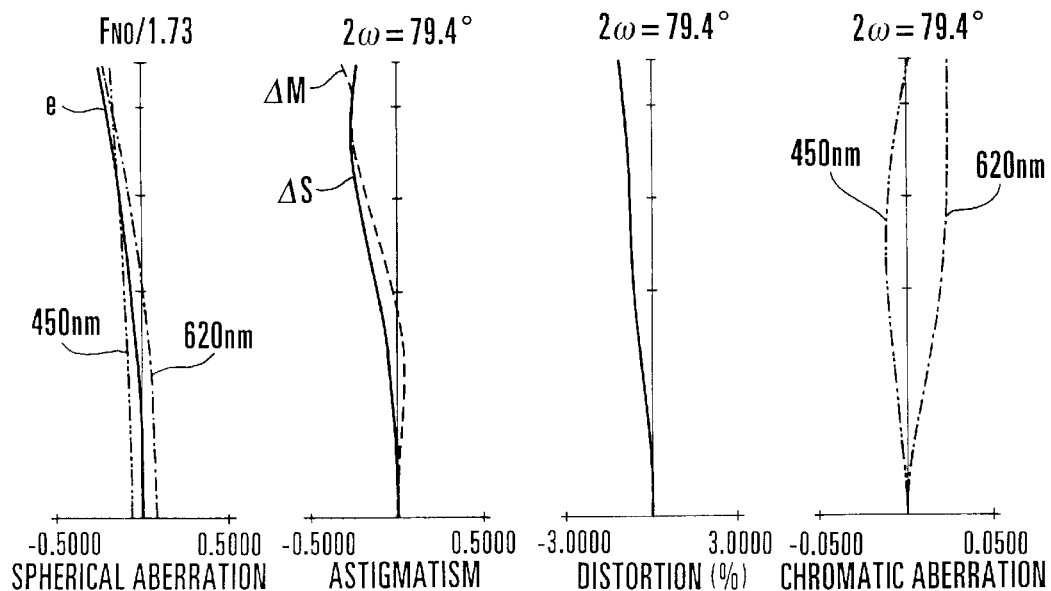
FIGS. 14A to 14D and FIGS. 15A to 15D are graphic representations of the aberrations of the projection lens of the numerical example 5 in the wide-angle end and the telephoto end, respectively.
Figures 15A, 15B, 15C, 15D:
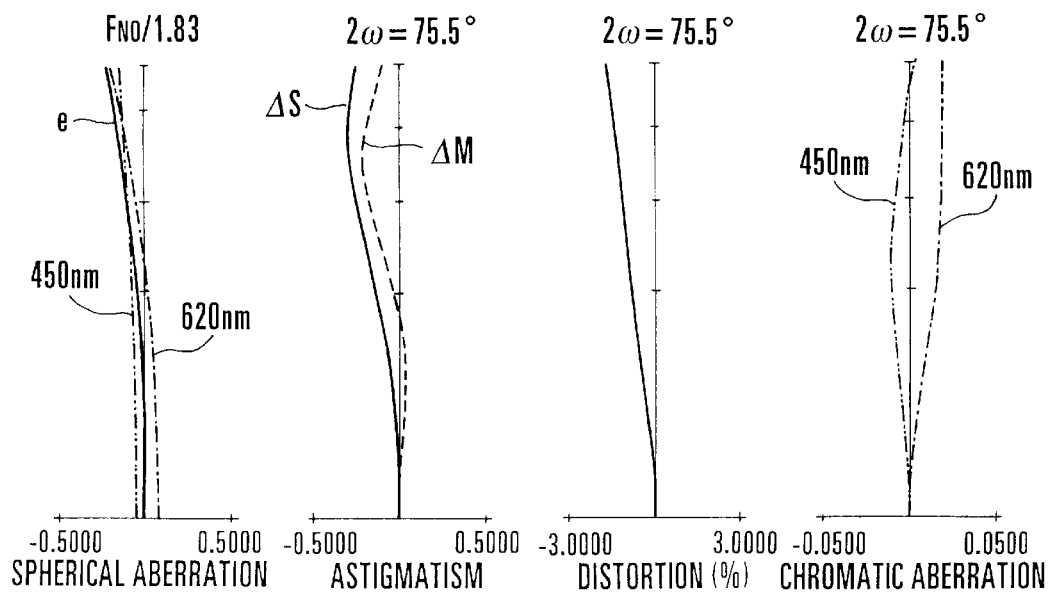

The projection lens of the numerical example 5 shown in FIG. 13 has numerical data in the following tables, where ri represents the radius of curvature of the i-th lens surface, when counted from the screen side, di represents the axial separation between the i-th and (i+1)st surfaces, ni represents the refractive index for the spectral d-line of the glass of the i-th lens element, and vi represents the Abbe number of the glass of the i-th lens element.

The shape of an aspheric surface is expressed in the coordinates with an X axis in the axial direction and a Y axis in the direction perpendicular to an optical axis, the direction in which light advances being made as positive, and the cross point of the vertex of the lens and the X axis being taken as the original point, by the following equation:

$$X = \frac{(1/r)Y^2}{1 + \sqrt{1 - (1+k)(Y/r)^2}} + BY^4 + CY^6 + DY^8 + EY^{10}$$

where r is the radius of the osculating sphere, and k, B, C, D and E are the aspheric coefficients.

Also, the notation "D–0X" means "$10^{-X}$", and the length is in units of millimeter.

FIGS. 14A to 14D and FIGS. 15A to 15D show the aberrations of the projection lens of the numerical example 5 with a conjugate distance of 820 mm. FIGS. 14A to 14D are the aberration curves in the wide-angle end, and FIGS. 15A to 15D in the telephoto end. Incidentally, in the numerical example 5, focus adjustment is carried out by moving the entire projection lens.

| | | | | | | | | |
|---|---|---|---|---|---|---|---|---|
| r1 = | 46.500 | d1 = | 3.00 | n1 = | 1.49377 | v1 = | 57.1 |
| *r2 = | 28.000 | d2 = | 10.31 | | | | |
| r3 = | 37.538 | d3 = | 3.00 | n2 = | 1.51793 | v2 = | 64.2 |
| r4 = | 27.264 | d4 = | 10.07 | | | | |
| r5 = | 36.106 | d5 = | 3.00 | n3 = | 1.51793 | v3 = | 64.2 |
| r6 = | 24.954 | d6 = | 38.04 | | | | |
| r7 = | Stop | d7 = | Variable | | | | |
| r8 = | 61.748 | d8 = | 5.33 | n4 = | 1.81250 | v4 = | 25.4 |
| r9 = | −5581.296 | d9 = | 16.25 | | | | |
| r10 = | −52.000 | d10 = | 2.60 | n5 = | 1.80554 | v5 = | 25.6 |
| r11 = | 71.667 | d11 = | 13.90 | n6 = | 1.62556 | v6 = | 58.2 |
| r12 = | −44.312 | d12 = | 0.10 | | | | |
| r13 = | −1967.957 | d13 = | 7.23 | n7 = | 1.63722 | v7 = | 54.4 |
| r14 = | −75.054 | d14 = | Variable | | | | |
| r15 = | 85.543 | d15 = | 8.96 | n8 = | 1.76880 | v8 = | 43.7 |
| r16 = | −161.197 | d16 = | 4.87 | | | | |
| r17 = | −57.590 | d17 = | 2.00 | n9 = | 1.81250 | v9 = | 25.4 |
| r18 = | 380.827 | d18 = | 0.20 | | | | |
| r19 = | 59.500 | d19 = | 11.04 | n10 = | 1.69799 | v10 = | 55.5 |
| r20 = | −642.446 | d20 = | 3.00 | | | | |
| r21 = | ∞ | d21 = | 4.90 | n11 = | 1.49200 | v11 = | 58.6 |
| r22 = | ∞ | | | | | | |

| Variable | Focal Length | |
|---|---|---|
| Separation | 24.33 | 25.77 |
| d7 | 4.57 | 1.10 |
| d14 | 1.00 | 4.87 |

Aspheric Coefficients for r2:

| | | | | | |
|---|---|---|---|---|---|
| k = | −9.89225D−01 | B = | 3.13527D−06 | C = | −8.99513D−10 |
| D = | 1.23180D−12 | E = | −7.66208D−16 | | |

Numerical Example 6

Figure 16:
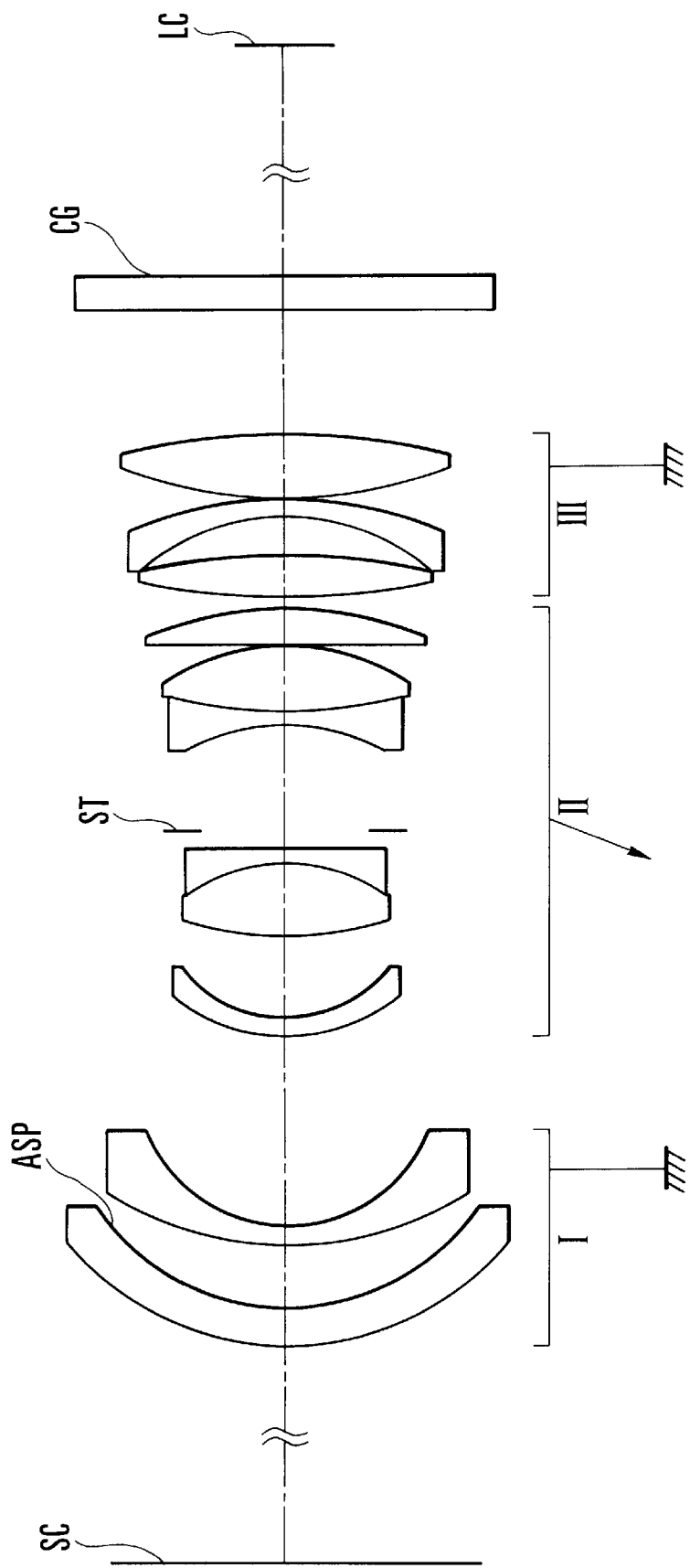
FIG. 16 is a longitudinal section view of a numerical example 6 of the projection lens.

The projection lens of the numerical example 6 shown in FIG. 16 has numerical data in the following tables, where the meanings of the parameters are the same as in the numerical example 5. So, the explanation of them is omitted here.

In the numerical example 6, the one of the convex lenses in the second lens unit II which lies nearer the screen SC than the stop ST produces aberrations, especially coma. To correct this coma well, that convex lens is cemented together with the next or concave lens. Also, at the front of the second lens unit II, a negative meniscus lens concave toward the screen SC is introduced to suppress the variation of aberrations with variation of the magnification.

FIGS. 17A to 17D and FIGS. 18A to 18D show the aberrations of the projection lens of the numerical example 6 with a conjugate distance of 820 mm. FIGS. 17A to 17D are the aberration curves in the wide-angle end, and FIGS. 18A to 18D in the telephoto end. Incidentally, in the numerical example 6, focus adjustment is carried out by moving the entire projection lens.

| r1 = | 52.178 | d1 = | 4.50 | n1 = | 1.49377 | v1 = | 57.1 |
|---|---|---|---|---|---|---|---|
| *r2 = | 32.500 | d2 = | 10.92 | | | | |
| r3 = | 58.000 | d3 = | 3.25 | n2 = | 1.60549 | v2 = | 60.6 |
| r4 = | 26.329 | d4 = | Variable | | | | |
| r5 = | 32.350 | d5 = | 2.50 | n3 = | 1.51825 | v3 = | 64.1 |
| r6 = | 22.634 | d6 = | 13.72 | | | | |
| r7 = | 58.340 | d7 = | 12.24 | | | | |
| r8 = | −26.000 | d8 = | 2.50 | n4 = | 1.81078 | v4 = | 40.9 |
| r9 = | −590.775 | d9 = | 2.76 | n5 = | 1.59911 | v5 = | 39.2 |
| r10 = | Stop | d10 = | 18.11 | | | | |
| r11 = | −35.000 | d11 = | 2.60 | n6 = | 1.81265 | v6 = | 25.4 |
| r12 = | 90.124 | d12 = | 10.62 | n7 = | 1.62509 | v7 = | 53.2 |
| r13 = | −41.130 | d13 = | 0.20 | | | | |
| r14 = | −700.784 | d14 = | 6.41 | n8 = | 1.66153 | v8 = | 50.9 |
| r15 = | −64.763 | d15 = | Variable | | | | |
| r16 = | 129.863 | d16 = | 7.25 | n9 = | 1.62555 | v9 = | 58.2 |
| r17 = | −106.445 | d17 = | 6.09 | | | | |
| r18 = | −38.847 | d18 = | 3.00 | n10 = | 1.81265 | v10 = | 25.4 |
| r19 = | −68.242 | d19 = | 0.20 | | | | |
| r20 = | 74.936 | d20 = | 11.04 | n11 = | 1.60549 | v11 = | 60.6 |
| r21 = | −128.910 | d21 = | 20.00 | | | | |
| r22 = | ∞ | d22 = | 5.60 | n12 = | 1.49200 | v12 = | 58.6 |
| r23 = | ∞ | | | | | | |

| Variable | Focal Length | |
|---|---|---|
| Separation | 24.16 | 25.76 |
| d4 | 31.57 | 27.56 |
| d15 | 1.75 | 5.76 |

Aspheric Coefficients for r2:

| k = | −2.68592D-01 | B = | −1.02493D-07 | C = | −4.49139D-09 |
|---|---|---|---|---|---|
| D = | 3.55066D-12 | E = | −2.30194D-15 | | |

Numerical Example 7

Figure 19:
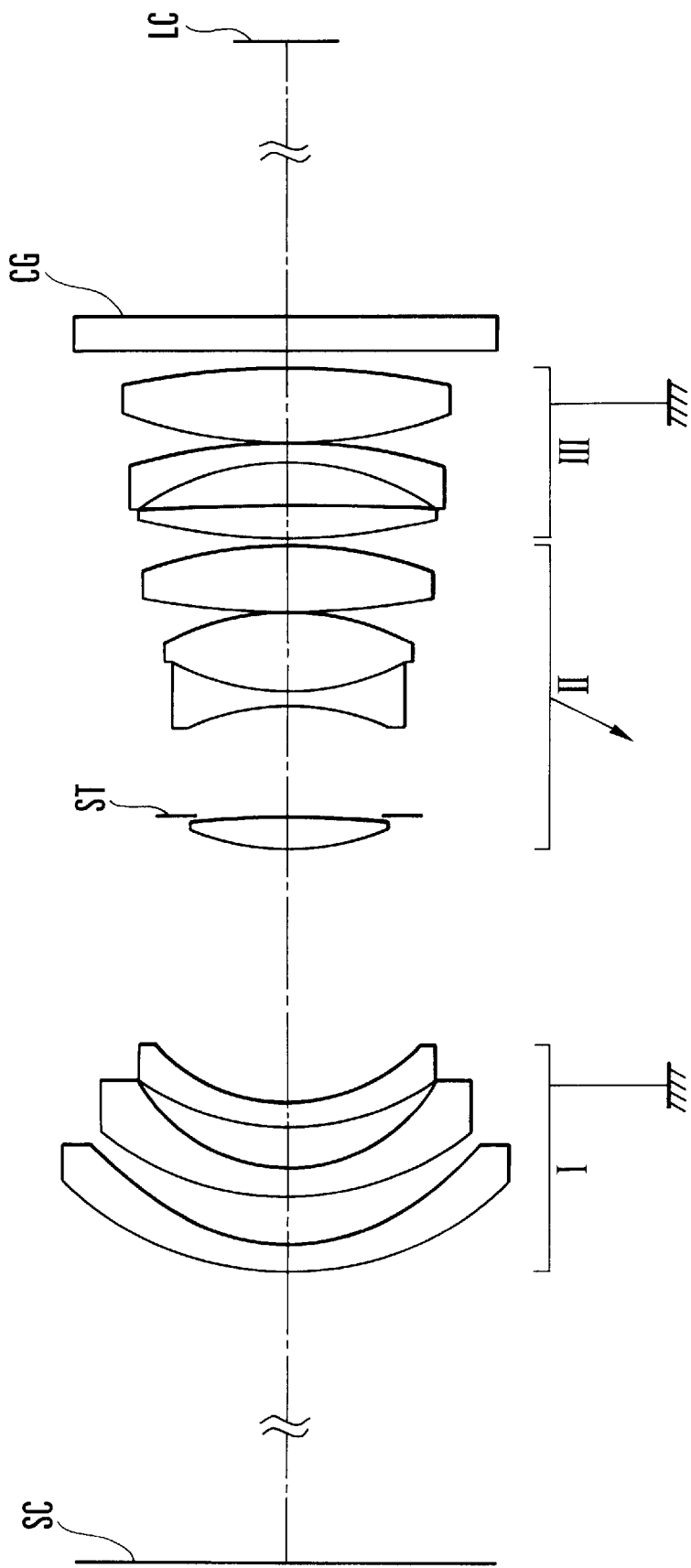
FIG. 19 is a longitudinal section view of a numerical example 7 of the projection lens.

The projection lens of the numerical example 7 shown in FIG. 19 has numerical data in the following tables, where the meanings of the parameters are the same as in the numerical example 5. So, the explanation of them is omitted here.

FIGS. 20A to 20D and FIGS. 21A to 21D show the aberrations of the projection lens of the numerical example 6 with a conjugate distance of 820 mm. FIGS. 20A to 20D are the aberration curves in the wide-angle end, and FIGS. 21A to 21D in the telephoto end. Incidentally, in the numerical example 7, focus adjustment is carried out by moving the third lens unit II toward the screen SC.

| r1 = | 54.000 | d1 = | 4.50 | n1 = | 1.49377 | v1 = | 57.1 |
|---|---|---|---|---|---|---|---|
| *r2 = | 32.500 | d2 = | 7.93 | | | | |
| r3 = | 51.819 | d3 = | 4.40 | n2 = | 1.73570 | v2 = | 44.4 |
| r4 = | 28.961 | d4 = | 6.82 | | | | |
| r5 = | 46.833 | d5 = | 3.50 | n3 = | 1.51793 | v3 = | 64.2 |
| r6 = | 30.561 | d6 = | Variable | | | | |
| r7 = | 46.080 | d7 = | 5.17 | n4 = | 1.82565 | v4 = | 30.2 |
| r8 = | −274.595 | d8 = | 0.10 | | | | |
| r9 = | Stop | d9 = | 18.11 | | | | |
| r10 = | −41.000 | d10 = | 2.60 | n5 = | 1.81419 | v5 = | 25.9 |
| r11 = | 42.095 | d11 = | 13.07 | n6 = | 1.54858 | v6 = | 62.1 |
| r12 = | −42.735 | d12 = | 0.10 | | | | |
| r13 = | 144.501 | d13 = | 10.78 | n7 = | 1.62556 | v7 = | 58.2 |
| r14 = | −72.394 | d14 = | Variable | | | | |
| r15 = | 107.729 | d15 = | 5.53 | n8 = | 1.69799 | v8 = | 55.5 |
| r16 = | −454.730 | d16 = | 7.25 | | | | |
| r17 = | −41.973 | d17 = | 3.00 | n9 = | 1.81250 | v9 = | 25.4 |
| r18 = | −95.146 | d18 = | 0.20 | | | | |
| r19 = | 82.955 | d19 = | 11.97 | n10 = | 1.69372 | v10 = | 55.7 |
| r20 = | −138.603 | d20 = | 3.00 | | | | |
| r21 = | ∞ | d21 = | 5.60 | n11 = | 1.49200 | v11 = | 58.6 |
| r22 = | ∞ | | | | | | |

| Variable | Focal Length | |
|---|---|---|
| Separation | 24.34 | 25.75 |
| d6 | 42.27 | 39.12 |
| d14 | 1.00 | 4.14 |

Aspheric Coefficients for r2:

| k = | −7.25606D-01 | B = | 3.84410D-07 | C = | −1.38715D-09 |
|---|---|---|---|---|---|
| D = | 1.95979D-14 | E = | −5.78715D-17 | | |

Numerical Example 8

Figure 22:
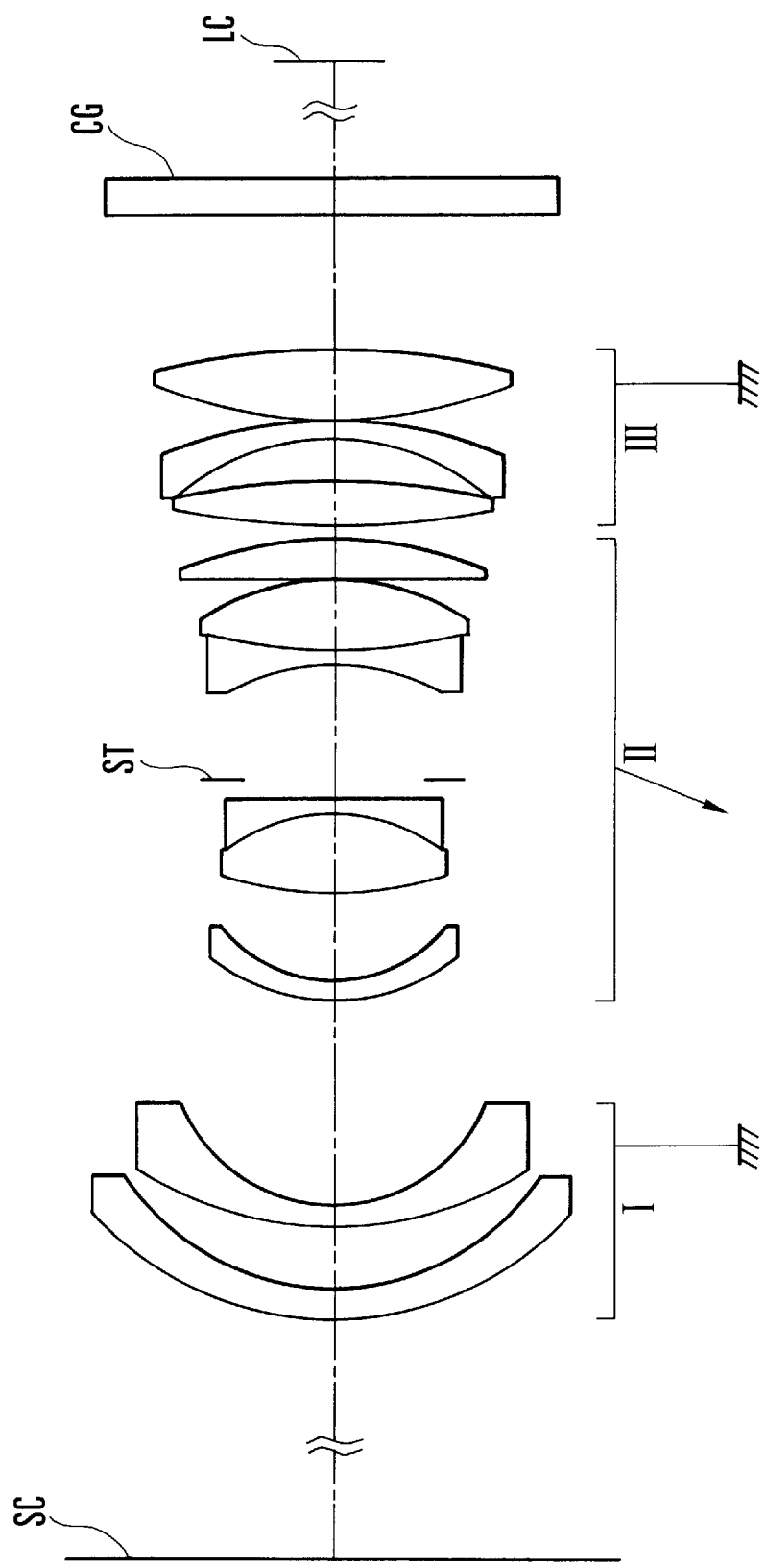
FIG. 22 is a longitudinal section view of a numerical example 8 of the projection lens.

The projection lens of the numerical example 8 shown in FIG. 22 has numerical data in the following tables, where the meanings of the parameters are the same as in the numerical example 5. So, the explanation of them is omitted here.

In the numerical example 8, focus adjustment is carried out by moving the third lens unit II toward the screen SC, while the first lens unit I is floated to correct the curvature of field produced when the screen size changes.

FIGS. 23A to 23D and FIGS. 24A to 24D show the aberrations of the projection lens of the numerical example 8 with a conjugate distance of 931 mm. FIGS. 23A to 23D are the aberration curves in the wide-angle end, and FIGS. 24A to 24D in the telephoto end.

| r1 = | 55.304 | d1 = | 4.50 | n1 = | 1.49375 | v1 = | 57.4 |
|---|---|---|---|---|---|---|---|
| *r2 = | 32.510 | d2 = | 9.81 | | | | |
| r3 = | 55.996 | d3 = | 3.25 | n2 = | 1.60548 | v2 = | 60.6 |
| r4 = | 26.593 | d4 = | Variable | | | | |
| r5 = | 32.722 | d5 = | 2.50 | n3 = | 1.51825 | v3 = | 64.1 |
| r6 = | 22.695 | d6 = | 13.56 | | | | |
| r7 = | 57.971 | d7 = | 12.50 | | | | |
| r8 = | −25.981 | d8 = | 2.50 | n4 = | 1.81078 | v4 = | 40.9 |
| r9 = | −572.163 | d9 = | 3.01 | n5 = | 1.59911 | v5 = | 39.2 |
| r10 = | Stop | d10 = | 18.06 | | | | |
| r11 = | −34.963 | d11 = | 2.60 | n6 = | 1.81264 | v6 = | 25.4 |
| r12 = | 88.244 | d12 = | 10.65 | n7 = | 1.62508 | v7 = | 53.2 |
| r13 = | −40.990 | d13 = | 0.20 | | | | |
| r14 = | −798.156 | d14 = | 6.35 | n8 = | 1.66152 | v8 = | 50.9 |
| r15 = | −66.036 | d15 = | Variable | | | | |
| r16 = | 135.725 | d16 = | 7.20 | n9 = | 1.62555 | v9 = | 58.2 |
| r17 = | −104.201 | d17 = | 6.05 | | | | |
| r18 = | −38.759 | d18 = | 3.00 | n10 = | 1.81264 | v10 = | 25.4 |
| r19 = | −66.512 | d19 = | 0.20 | | | | |
| r20 = | 74.791 | d20 = | 11.25 | n11 = | 1.60548 | v11 = | 60.6 |
| r21 = | −132.007 | d21 = | 20.00 | | | | |
| r22 = | ∞ | d22 = | 5.60 | n12 = | 1.49296 | v12 = | 58.6 |
| r23 = | ∞ | | | | | | |

| Variable | Focal Length | |
|---|---|---|
| Separation | 24.22 | 25.83 |
| d4 | 31.79 | 27.77 |
| d15 | 2.04 | 6.06 |

Aspheric Coefficients for r2:

| k = | −2.61267D-01 | B = | −1.08731D-07 | C = | −4.87427D-09 |
|---|---|---|---|---|---|
| D = | 3.92883D-12 | E = | −2.45537D-15 | | |

The values of L/fr for the numerical examples 5 to 8 are listed in Table-2 below.

TABLE 2

| Numerical Example No. | L/fr |
|---|---|
| 5 | 0.912 |
| 6 | 0.902 |
| 7 | 0.889 |
| 8 | 0.905 |

It will be appreciated from the foregoing that, according to the invention, the projection lens having a capability of changing the scanning rate can be realized in a simple form.

What is claimed is:

1. A projection lens for use in a projection apparatus in which a conjugate distance between an original picture and a screen onto which to project the original picture is substantially fixed, said projection lens comprising, in order from the screen side, a first lens unit of negative refractive power and a second lens unit of positive refractive power, wherein, when a magnification of projection is shifted from a higher magnification to a lower magnification, said first lens unit remains stationary and said second lens unit moves toward the screen side to change a focal length, and said projection lens satisfying the following condition:

$$0.85 < L/fr < 1.0$$

where fr is an overall focal length in a wide-angle end of lenses which lie nearer the original picture than a stop, and L is a distance from said stop to a front principal point of the whole lenses which lie nearer the original picture than said stop.

2. A projection lens according to claim 1, wherein said first lens unit has at least one aspheric surface.

3. A projection lens according to claim 2, wherein said first lens unit has a negative meniscus lens convex toward the screen side at a position closest to the screen side, and a surface on the original picture side of said negative meniscus lens is an aspheric surface.

4. A projection lens according to claim 1, wherein said first lens unit has at least two negative meniscus lenses convex toward the screen side.

5. A projection lens according to claim 1, further comprising a third lens unit of positive refractive power.

6. A projection lens according to claim 5, wherein focusing is performed by moving said third lens unit along an optical axis.

7. A projection lens according to claim 1, wherein, when the screen has changed in size, any deterioration of an image on the screen is compensated for by utilizing a floating mechanism included in said first lens unit.

8. A projection lens according to claim 1, satisfying the following relationships:

$$\beta 2w = -1/\sqrt{\sqrt{Z}}$$

$$M = f2 \times \beta 2w \times (1-Z)$$

$$\beta 1w = f1/x$$

$$ew = f1 + f2 - f1 \times \beta 1w - f2/\beta 2w$$

where β1w and β2w are paraxial lateral magnifications in a wide-angle end of said first lens unit and said second lens unit, respectively, Z is a ratio of variable magnifications, M is an amount of movement of said second lens unit from the wide-angle end to a telephoto end, x is a distance from a focal point on the screen side of said first lens unit to the screen, f1 and f2 are focal lengths of said first lens unit and said second lens unit, respectively, and ew is a principal point interval between said first lens unit and said second lens unit.

9. A projection apparatus having a projection lens according to claim 1, wherein the original picture is projected onto the screen by said projection lens.

10. A projection lens for use in a projection apparatus in which a conjugate distance between an original picture and a screen onto which to project the original picture is substantially fixed, said projection lens comprising, in order from the screen side, a first lens unit of negative refractive power and a second lens unit of positive refractive power, wherein, when a magnification of projection is shifted from a higher magnification to a lower magnification, said first lens unit remains stationary and said second lens unit moves toward the screen side to change a focal length and when the screen has changed in size, any deterioration of an image on the screen is compensated for by utilizing a floating mechanism included in said first lens unit.

11. A projection lens according to claim 10, wherein said first lens unit has at least one aspheric surface.

12. A projection lens according to claim 11, wherein said first lens unit has a negative meniscus lens convex toward the screen side at a position closest to the screen side, and a surface on the original picture side of said negative meniscus lens is an aspheric surface.

13. A projection lens according to claim 10, wherein said first lens unit has at least two negative meniscus lenses convex toward the screen side.

14. A projection lens according to claim 10, further comprising a third lens unit of positive refractive power.

15. A projection lens according to claim 14 wherein said third lens unit has at least one positive lens and at least one negative lens, and said negative lens has a concave surface having a stronger refractive power on the screen side as compared to the original picture side.

16. A projection lens according to claim 14, wherein said third lens unit has at least one positive lens and at least one negative lens, and said negative lens has a concave surface having a stronger refractive power on the screen side as compared to the original picture side.

17. A projection lens according to claim 14, wherein focusing is performed by moving said third lens unit along an optical axis.

18. A projection lens according to claim 10, satisfying the following relationships:

$$\beta 2w = -1/\sqrt{\sqrt{Z}}$$

$$M = f2 \times \beta 2w \times (1-Z)$$

$$\beta 1w = f1/x$$

$$ew = f1 + f2 - f1 \times \beta 1w - f2/\beta 2w$$

where β1w and β2w are paraxial lateral magnifications in a wide-angle end of said first lens unit and said second lens unit, respectively, Z is a ratio of variable magnifications, M is an amount of movement of said second lens unit from the wide-angle end to a telephoto end, x is a distance from a focal point on the screen side of said first lens unit to the screen, f1 and f2 are focal lengths of said first lens unit and said second lens unit, respectively, and Ew is a principal point interval between said first lens unit and said second lens unit.

19. A projection apparatus having a projection lens according to claim 10, wherein the original picture is projected onto the screen by said projection lens.

* * * * *